(12) United States Patent
Tsuda et al.

(10) Patent No.: US 11,594,981 B2
(45) Date of Patent: Feb. 28, 2023

(54) POWER SUPPLY DEVICE

(71) Applicant: Mitsubishi Electric Corporation, Tokyo (JP)

(72) Inventors: Shingo Tsuda, Tokyo (JP); Taichiro Tamida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 21 days.

(21) Appl. No.: 17/439,810

(22) PCT Filed: May 20, 2019

(86) PCT No.: PCT/JP2019/019910
§ 371 (c)(1),
(2) Date: Sep. 16, 2021

(87) PCT Pub. No.: WO2020/234964
PCT Pub. Date: Nov. 26, 2020

(65) Prior Publication Data
US 2022/0103093 A1 Mar. 31, 2022

(51) Int. Cl.
*H02M 7/493* (2007.01)
*H02M 1/32* (2007.01)
*H02M 1/00* (2006.01)

(52) U.S. Cl.
CPC ......... *H02M 7/493* (2013.01); *H02M 1/0077* (2021.05); *H02M 1/327* (2021.05); *H02M 1/0012* (2021.05)

(58) Field of Classification Search
CPC .. H02M 7/493; H02M 1/0012; H02M 1/0077; H02M 1/327
See application file for complete search history.

(56) References Cited

U.S. PATENT DOCUMENTS

| 2006/0050536 A1 | 3/2006 | Kim et al. |
| 2006/0139977 A1* | 6/2006 | Oicles ..................... H02M 3/07 363/16 |

(Continued)

FOREIGN PATENT DOCUMENTS

| JP | 2003-9548 A | 1/2003 |
| JP | 2006-81143 A | 3/2006 |

(Continued)

OTHER PUBLICATIONS

International Search Report and Written Opinion dated Jul. 30, 2019, received for PCT Application PCT/JP2019/019910, filed on May 20, 2019, 11 pages including English Translation.

*Primary Examiner* — Jue Zhang
(74) *Attorney, Agent, or Firm* — Xsensus LLP

(57) ABSTRACT

A power supply device includes: "m×n" switching elements; capacitors connected in series to corresponding ones of the switching elements and forming "m×n" series circuits; a charger charging the capacitors; "m" transformers in which primary windings are connected to both ends of corresponding ones of "m" parallel circuits formed by connecting "n" units of the series circuits in parallel to one another with the polarity aligned; a current detection unit detecting, as a detected current value, current flowing through a multistage series circuit in which secondary windings of the transformers are sequentially connected in series so that both ends of the circuit serve as output terminals; a control unit outputting a command signal generated based on the detected current value and a current command being a target value of the current output from the output terminals; and a drive unit driving the switching elements and the charger based on the command signal.

11 Claims, 12 Drawing Sheets

(56) References Cited

U.S. PATENT DOCUMENTS

| | | | | |
|---|---|---|---|---|
| 2015/0070948 A1* | 3/2015 | Johnson | ................... | H02J 3/38 363/40 |
| 2017/0338618 A1 | 11/2017 | Jiang et al. | | |
| 2018/0367125 A1* | 12/2018 | Yeckel | ................... | H02M 1/16 |
| 2019/0252846 A1 | 8/2019 | Jiang et al. | | |
| 2020/0313567 A1* | 10/2020 | Porter, Jr. | ......... | H02M 3/33507 |

FOREIGN PATENT DOCUMENTS

| | | |
|---|---|---|
| JP | 2006-324039 A | 11/2006 |
| JP | 2009-136122 A | 6/2009 |
| WO | 2016/152738 A1 | 9/2016 |
| WO | 2018/229853 A1 | 12/2018 |

* cited by examiner

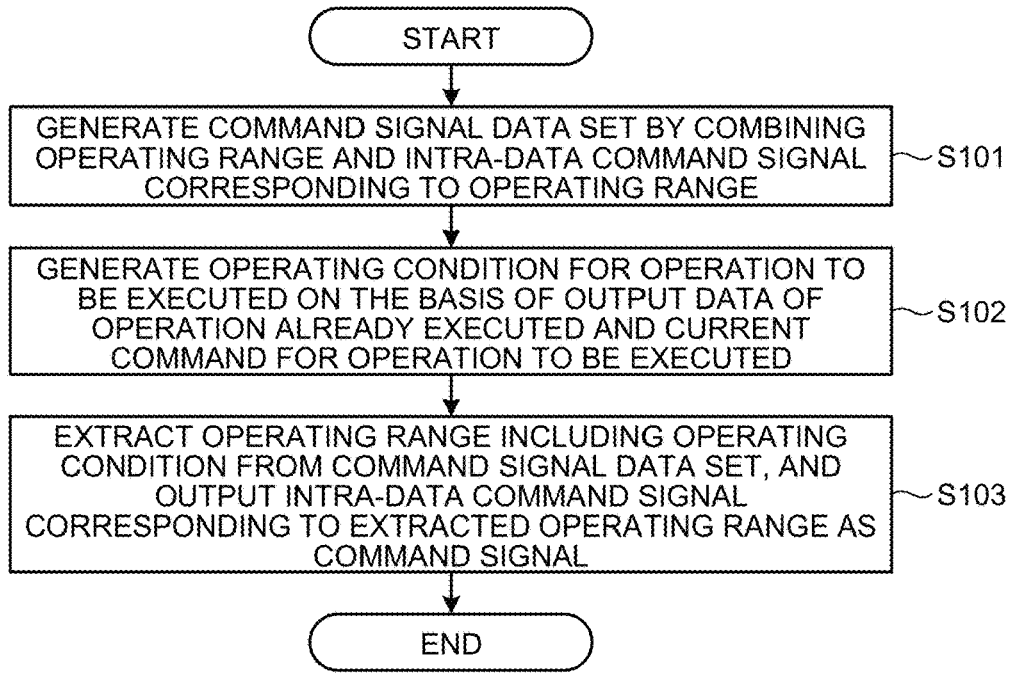
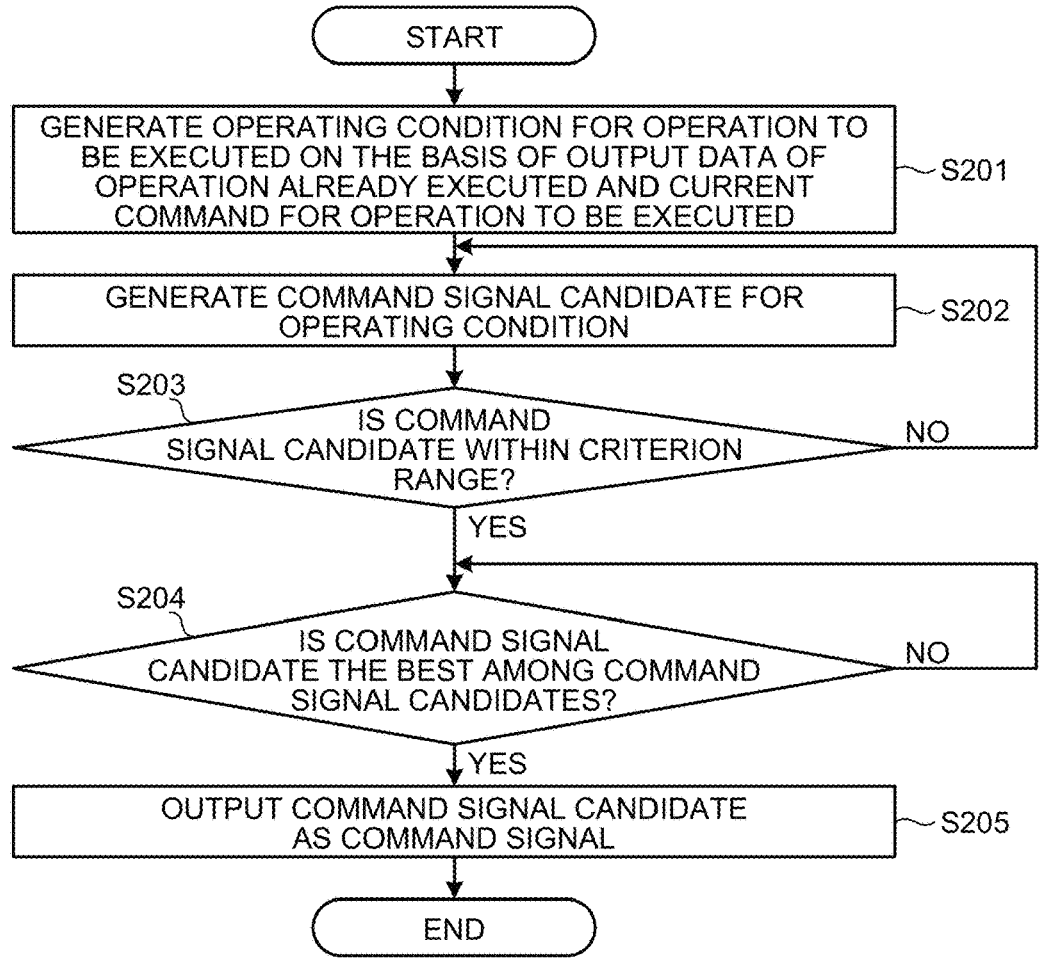

FIG.6A

| | OPERATING RANGE | INTRA-DATA COMMAND SIGNAL |
|---|---|---|
| PULSE WIDTH | 50 ns OR LONGER AND 100 ns OR SHORTER | DRIVE SERIES CIRCUITS IN FIRST TO 20TH STAGES AND FIRST TO FIFTH COLUMNS |
| PEAK CURRENT VALUE | 80 A OR HIGHER AND 100 A OR LOWER | |
| PEAK VOLTAGE VALUE | 10 kV OR HIGHER AND 20 kV OR LOWER | |
| TEMPERATURE | 20 DEGREES CELSIUS OR HIGHER AND 50 DEGREES CELSIUS OR LOWER | |

FIG.6B

| | OPERATING RANGE | COMMAND SIGNAL |
|---|---|---|
| PULSE WIDTH | 50 ns OR LONGER AND 100 ns OR SHORTER | DRIVE SERIES CIRCUITS IN FIRST TO 20TH STAGES AND FIRST TO FOURTH COLUMNS |
| PEAK CURRENT VALUE | 60 A OR HIGHER AND 80 A OR LOWER | |
| PEAK VOLTAGE VALUE | 10 kV OR HIGHER AND 20 kV OR LOWER | |
| TEMPERATURE | 20 DEGREES CELSIUS OR HIGHER AND 50 DEGREES CELSIUS OR LOWER | |

FIG.7

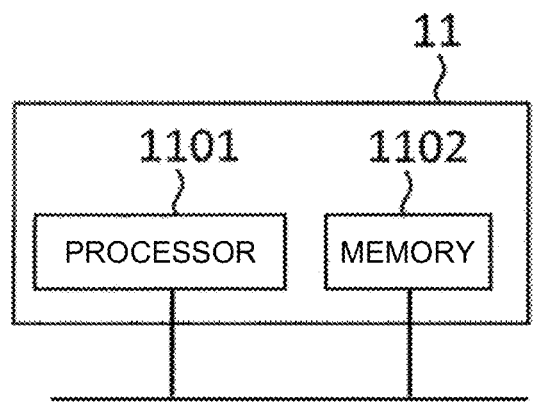

POWER SUPPLY DEVICE

CROSS-REFERENCE TO RELATED APPLICATION

The present application is based on PCT filing PCT/JP2019/019910, filed May 20, 2019, the entire contents of which are incorporated herein by reference.

FIELD

The present invention relates to a power supply device that supplies high-output power by modulation of current using a plurality of switching elements and superposition of voltage using a plurality of transformers.

BACKGROUND

A power supply device that generates a high-output pulse current is used for a sterilization device and a water treatment device using pulse arc discharge, a laser oscillator, an exhaust gas purification device, an ozone generator, an extreme ultra-violet (EUV) light source, and the like. These are called plasma application devices, discharge devices, or the like.

A gas discharge switch used in these power supply devices has problems with life and stability, and thus a semiconductor switching element using a semiconductor device has come to be used. A technique has then been proposed in which power of a desired waveform is supplied by combining a switching operation of the semiconductor switching element and superposition of induced voltage by a transformer.

Patent Literature 1 discloses a high-voltage pulse generating device that applies a high voltage across discharge electrodes of a gas laser device. The high-voltage pulse generating device includes "n" primary side electrical circuits (where "n" is a natural number of 2 or greater) connected in parallel to each other on a primary side of a pulse transformer. Each of the primary side electrical circuits includes a primary side coil, a capacitor connected in parallel to the primary side coil, and a switch connected in series to the capacitor.

A secondary side electrical circuit is further included on a secondary side of the pulse transformer. The secondary side electrical circuit includes "n" secondary side coils connected in series to each other and "n" diodes connected to both ends of corresponding ones of the "n" secondary side coils, and is connected to the discharge electrodes.

CITATION LIST

Patent Literature

Patent Literature 1: International Publication No. WO 2016/152738

SUMMARY

Technical Problem

In the high-voltage pulse generating device described in Patent Literature 1, a plurality of switching elements and a plurality of transformers are combined to generate a high-voltage pulse. The characteristics of the switching elements vary depending on the voltage and current of the switching elements, and there is an individual difference among the plurality of switching elements used.

Moreover, the impedance of an electrical load device varies depending on an output voltage and an output current to the electrical load device, and there is an individual difference in the impedance of the electrical load device. As described above, due to the individual differences in the switching elements and the electrical load device, the variations depending on the output voltage and the output current, and the like, an operator has been required to perform adjustment over a long period of time in some cases in order to supply power having a desired time waveform by driving the plurality of switching elements.

The present invention has been made in view of the above, and an object of the present invention is to provide a power supply device capable of supplying power having a desired time waveform to an electrical load device without requiring long adjustment by an operator.

Solution to Problem

A power supply device according to the present invention includes: "m×n" switching elements (where "m" and "n" are integers of 2 or greater); "m×n" capacitors connected in series to corresponding ones of the switching elements and forming "m×n" series circuits; a charger to charge the capacitors; "m" transformers in which both ends of each primary winding are connected to both ends of a corresponding one of "m" parallel circuits that are formed by connecting "n" units of the series circuits in parallel to one another with the polarity aligned; a current detection unit to detect a current flowing through a multistage series circuit in which both ends of secondary windings of the "m" transformers are sequentially connected in series so that both ends of the circuit serve as output terminals, and to output the detected current as a detected current value; a control unit to output a command signal generated on the basis of a current command and the detected current value, the current command being a target value of the current output from the output terminals; and a drive unit to drive the switching elements and the charger on the basis of the command signal.

Advantageous Effects of Invention

The present invention can provide the power supply device capable of supplying power having a desired time waveform to the electrical load device without requiring long adjustment by an operator.

BRIEF DESCRIPTION OF DRAWINGS

FIGS. 5A and 5B are flowcharts illustrating an example of an operation of the control unit according to the first embodiment.

FIGS. 6A and 6B are tables illustrating an example of a command signal data set according to the first embodiment.

FIG. 7 is a diagram illustrating an example of a hardware configuration of an operating condition generating unit according to the first embodiment.

DESCRIPTION OF EMBODIMENTS

Hereinafter, embodiments will be described in detail with reference to the drawings. Note that the embodiments described below are examples.

First Embodiment

Figure 1:
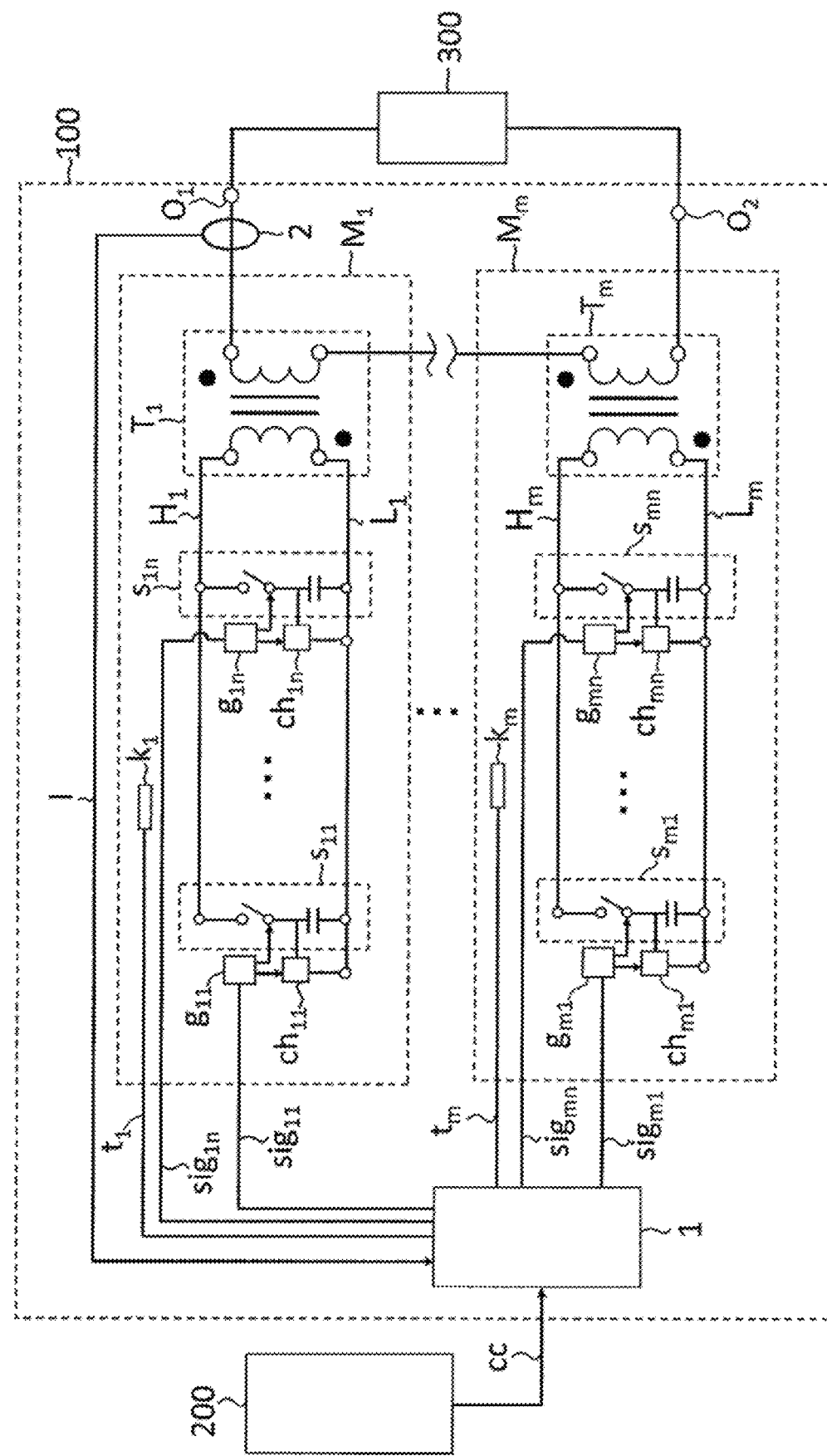
FIG. 1 is a schematic diagram illustrating an example of a configuration of a power supply device according to a first embodiment.
Figure 2:
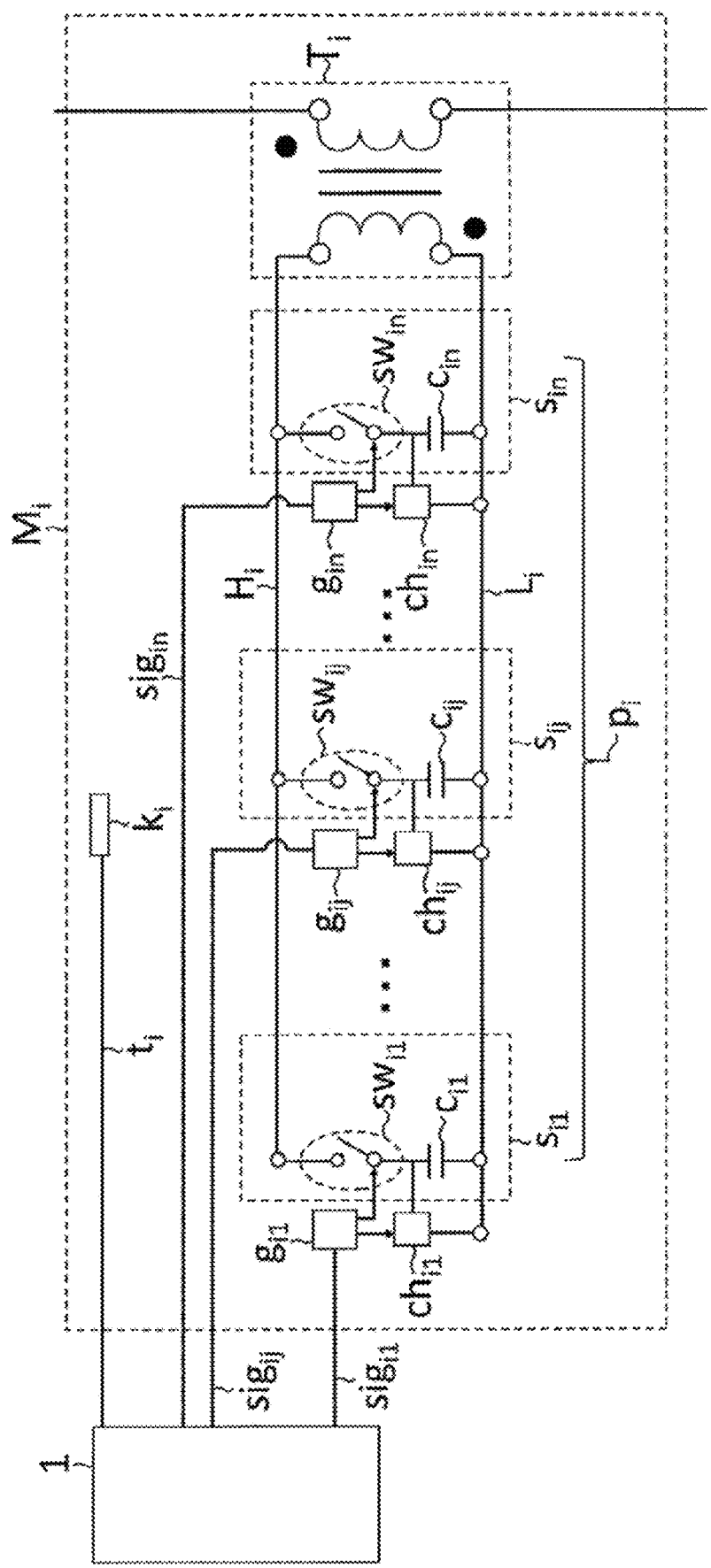
FIG. 2 is a schematic diagram illustrating an example of a configuration of a module according to the first embodiment.

FIG. 1 is a schematic diagram illustrating an example of a configuration of a power supply device 100 according to a first embodiment. FIG. 2 is a schematic diagram illustrating an example of a configuration of a module $M_i$ according to the first embodiment. The power supply device 100 illustrated in FIGS. 1 and 2 outputs a current to an electrical load device 300 connected between an output terminal $O_1$ and an output terminal $O_2$ on the basis of a current command cc output from a numerical controller 200. Here, the current command cc indicates a target value of an output current. As the numerical controller 200, for example, a sequencer, a computer, or the like can be used.

Next, the configuration of the power supply device 100 will be described. The power supply device 100 includes modules $M_1$ to $M_m$. Here, a row number "i" assigned to a module $M_i$ is any one of "1" to "m", where "m" is an integer of 2 or greater. A structure of the module $M_i$ will be described with reference to FIG. 2. In the following description, when a component with the row number "i" is described, it is assumed that descriptions of components with the row numbers "1" to "m" are similar to the description of the component with the row number "i".

Likewise, when a component with a column number "j" is described, it is assumed that descriptions of components with column numbers "1" to "n" are similar to the description of the component with the column number "j". Here, the column number "j" is any one of "1" to "n", where "n" is a natural number of 2 or greater.

The module $M_i$ includes chargers $ch_{i1}$ to $ch_{in}$, series circuits $s_{i1}$ to $s_{in}$, drive units $g_{i1}$ to $g_{in}$, a transformer $T_i$, and a temperature detector $k_i$. The series circuit $s_{ij}$ includes a switching element $sw_{ij}$ and a capacitor $c_{ij}$ connected in series to the switching element $sw_{ij}$.

The drive unit $g_{ij}$ drives the switching element $sw_{ij}$ and the charger $ch_{ij}$ on the basis of a command signal $sig_{ij}$. The switching element $sw_{ij}$ performs a switching operation, and the charger $ch_{ij}$ charges the capacitor $c_{ij}$. The drive unit $g_{ij}$ can also drive the switching element $sw_{ij}$ and the charger $ch_{ij}$ individually. As the drive unit $g_{ij}$, a circuit that drives the switching element $sw_{ij}$ may be used. Alternatively, as the drive unit $g_{ij}$, a semiconductor element, a switch, or a relay that drives the charger $ch_{ij}$ may be used.

The series circuits $s_{i1}$ to $s_{in}$ are connected in parallel to one another with the polarity aligned to form a parallel circuit $p_i$. The state in which the polarity is aligned means a state in which a positively-charged side of the capacitor $c_{ij}$ coincides among the capacitors $c_{i1}$ to $c_{in}$ in the parallel circuit $p_i$.

An end of the parallel circuit $p_i$ on the side where the capacitor $c_i$ is positively charged is referred to as a high potential side $H_i$ of the parallel circuit $p_i$. An end on the side opposite to the high potential side is referred to as a low potential side $L_i$ of the parallel circuit $p_i$. Moreover, the high potential side $H_i$ and the low potential side $L_i$ are referred to as both ends of the parallel circuit $p_i$. The both ends of the parallel circuit $p_i$ are connected to both ends of primary winding of the transformer $T_i$.

The relationship between the number of capacitors $c_{ij}$ and the number of chargers $ch_{ij}$ is not limited to the mode illustrated in FIGS. 1 and 2, and one charger $ch_{ij}$ may be provided for a plurality of the capacitors $c_{ij}$. Also, a plurality of capacitors connected in parallel may be used as the capacitor $c_{ij}$. The series circuit $s_{ij}$ may further include an inductor or a resistor in addition to the capacitor $c_{ij}$ and the switching element $sw_{ij}$. In this case, the inductor or the resistor may be connected in series or in parallel to the capacitor $c_{ij}$ and the switching element $sw_{ij}$.

The temperature detector $k_i$ outputs a result of measuring the temperature of the switching element $sw_{ij}$ inside the module $M_i$ to the control unit 1 as a detected temperature signal $t_i$. The drive unit $g_{ij}$ drives the switching element $sw_{ij}$ and the charger $ch_{ij}$ on the basis of the command signal $sig_{ij}$ output from the control unit 1. The structure of the module $M_i$ has been described.

In the present embodiment, the temperature detector $k_i$ may be arranged in any way as long as the temperature of the switching element $sw_{ij}$ can be measured. The arrangement of the temperature detector $k_i$ is not limited to the mode of FIGS. 1 and 2. For example, one temperature detector may be provided for the power supply device 100 or the switching element $sw_{ij}$. Alternatively, the temperature detector $k_i$ may be omitted, and the control unit 1 may determine the command signal $sig_{ij}$ without using a detected temperature signal $t_i$.

In the transformers $T_1$ to $T_m$, secondary windings are sequentially connected in series to form a multistage series circuit MSSC. An end of the multistage series circuit MSSC on the side of the transformer $T_1$ corresponds to the output terminal $O_1$, and an end on the side of the transformer $T_m$ corresponds to the output terminal $O_2$. The electrical load device 300 is connected between the output terminal $O_1$ and the output terminal $O_2$. In addition, a current detection unit 2 that measures a current flowing through the output terminal $O_1$ and outputs the measured current as a detected current value I is provided. The current detection unit 2 only needs to detect a current flowing through the multistage series circuit MSSC, and thus may measure a current flowing through the output terminal $O_2$.

A detection device D that detects a current or a voltage may be provided for any one or more of the module $M_i$, the parallel circuit $P_i$, the series circuit $s_{ij}$, the switching element $sw_{ij}$, the multistage series circuit MSSC, and the electrical load device 300, and a detection result may be output as a detected value d.

Moreover, it is not necessary to provide one drive unit $g_{ij}$ for each series circuit $s_{ij}$ as illustrated in FIGS. 1 and 2, and one drive unit may be provided for a plurality of the series circuits $s_{ij}$. In addition, instead of driving the switching elements $sw_{ij}$ individually, a plurality of the switching elements $sw_{ij}$ may be driven at the same timing or may be driven to perform the same switching operation. Similarly, instead of driving the chargers $ch_{ij}$ individually, a plurality of the chargers $ch_{ij}$ may be driven at the same timing or may be driven to perform a charging operation in the same manner.

Figure 3:
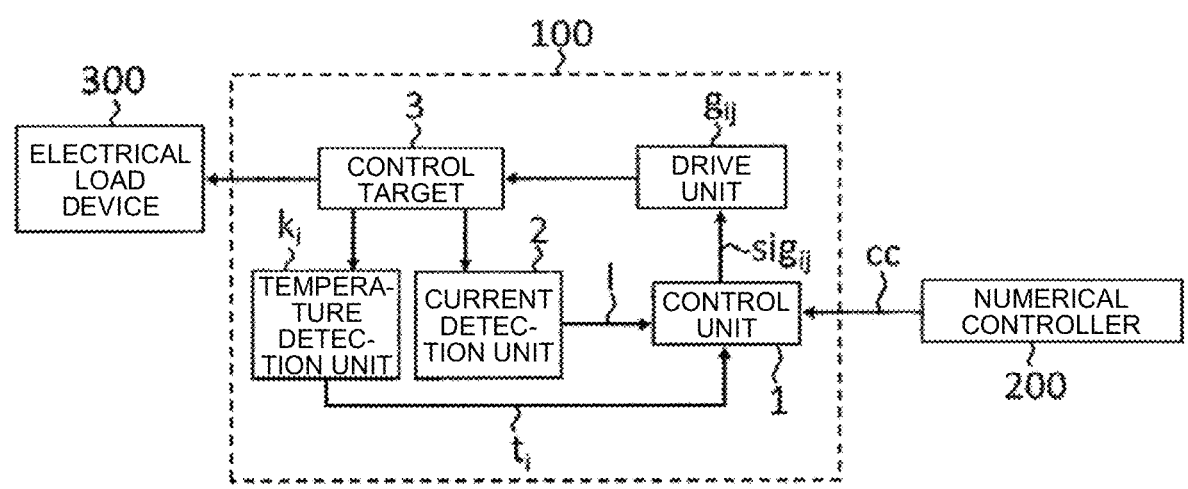
FIG. 3 is a block diagram illustrating an example of a configuration of the power supply device according to the first embodiment.

Next, the control unit 1 will be described. FIG. 3 is a block diagram illustrating an example of a configuration of the power supply device 100 according to the first embodiment. In FIG. 3, the parallel circuit $p_i$, the charger $ch_{ij}$, and the like are collectively illustrated as a control target 3, and the relationship between the control target 3 and the current detection unit 2, a temperature detection unit $k_{ij}$, the control unit 1, and the drive unit $g_{ij}$ is illustrated.

In FIG. 3, the control unit 1 acquires the current command cc from the numerical controller 200. The control unit 1 further acquires, as output data, an executed command signal that is the command signal $sig_{ij}$ already executed for use by the drive unit $g_{ij}$ to drive the switching element $sw_{ij}$ and the charger $ch_{ij}$, and the detected current value I of the current generated by the executed command signal. As the output data, the detected temperature value $t_i$, the detected value d related to an operation according to the executed command signal, and the like may be further acquired.

From the output data and the current command cc of an operation to be executed, the control unit 1 estimates an output voltage to be applied between the output terminal $O_1$ and the output terminal $O_2$ in the operation to be executed. The control unit 1 then determines the command signal $sig_{ij}$ for the operation to be executed from operating conditions including the current command cc and the estimated output voltage, and outputs the command signal $sig_{ij}$ to the drive unit $g_{ij}$. The drive unit $g_{ij}$ drives the control target 3 on the basis of the command signal $sig_{ij}$.

Here, the impedance of the electrical load device 300 may be estimated instead of the output voltage. The control unit 1 may also output the command signal $sig_{ij}$ such that the current output from the power supply device 100 to the electrical load device 300 follows the current command cc. Moreover, even before the operation by a series of the command signals $sig_{ij}$ is completed, if the operation by the command signals $sig_{ij}$ is partially completed, the command signals may be used as the executed command signal to generate the operating conditions.

Hereinafter, the current flowing through the switching element $sw_{ij}$ is referred to as a current of the switching element $sw_{ij}$, and the voltage applied to the switching element $sw_{ij}$ is referred to as a voltage of the switching element $sw_{ij}$. Here, the current value and the voltage value per switching element $sw_{ij}$ each have a range in which an appropriate switching operation state is achieved. The ranges of the current value and the voltage value are referred to as an appropriate current range and an appropriate voltage range, respectively. Here, the state in which the appropriate operation state of the switching element $sw_{ij}$ is achieved can correspond to the following state.

That is, the time required for switching is less than or equal to a predetermined reference value of the switching time. In addition, the switching element $sw_{ij}$ has the value of conduction resistance smaller than a predetermined reference value for low resistance in an "on" state in which the switching element $sw_{ij}$ is conductive. Furthermore, in an "off" state in which the switching element $sw_{ij}$ is non-conductive, the switching element $sw_{ij}$ has the value of conduction resistance larger than a predetermined reference value for high resistance.

Note that the reference value of the switching time, the reference value for low resistance, and the reference value for high resistance may be determined by measuring the switching operation of each switching element $sw_{ij}$, or may be determined by calculation from the specifications of the switching element $sw_{ij}$. Also, the reference value for high resistance is larger than the reference value for low resistance.

On the basis of the operating conditions, the control unit 1 determines the command signal $sig_{ij}$ such that the current value of the switching element $sw_{ij}$ and the voltage value of the switching element $sw_{ij}$ are included in the appropriate current range and the appropriate voltage range, respectively.

Here, information specifying the number of parallel circuits $p_i$ to be driven and the number of switching elements $sw_{ij}$ to be driven inside the parallel circuit $p_i$ to be driven is referred to as drive information. The command signal $sig_{ij}$ may include the drive information. A value obtained by dividing the output voltage by the number of modules $M_i$ to be driven is the voltage value of one switching element $sw_{ij}$.

Moreover, a value obtained by dividing the current command cc by the number of switching elements $sw_{ij}$ to be driven inside the module $M_i$ to be driven is the current value of one switching element $sw_{ij}$. As described above, in the case where the command signal $sig_{ij}$ includes the drive information, the operating conditions can be associated with the current and the voltage per switching element $sw_{ij}$. In addition, the current and the voltage per switching element $sw_{ij}$ can be calculated from the operating conditions.

The command signal $sig_{ij}$ can then be determined by comparing the current and the voltage per switching element $sw_{ij}$ with the appropriate current range and the appropriate voltage range. Moreover, a characteristic that changes depending on the current or the voltage of each switching element $sw_{ij}$ or a combination thereof can be reflected in the command signal $sig_{ij}$ being output.

In addition, the current and the voltage of each switching element $sw_{ij}$ can be determined such that each switching element $sw_{ij}$ can exhibit desired switching performance. Here, the row number and the column number of the series circuit $s_{ij}$ to be driven may be specified as the drive information. Also, the number of modules $M_i$ may be specified instead of the number of parallel circuits $p_i$.

The conduction resistance, the appropriate current range, the appropriate voltage range, and the like of the switching element $sw_{ij}$ will be described with a specific example. A metal oxide semiconductor field effect transistor (MOSFET) is exemplified as the switching element $sw_{ij}$.

In MOSFET switching, the switching time is longer as the current of the switching element $sw_{ij}$ is smaller or as the voltage of the switching element $sw_{ij}$ is smaller. Therefore, when the current of the switching element $sw_{ij}$ or the voltage of the switching element $sw_{ij}$ is too small, the time required for switching may exceed the reference value of the switching time.

Here, the switching time may be, for example, a sum of the time required for the resistance value to vary from 10% to 90% of the total variation due to switching and the time required for the resistance value to vary from 90% to 10% of the total variation. Here, the total variation may be a difference between the resistance value at the time of high resistance and the resistance value at the time of low resistance of the switching element $sw_{ij}$. Moreover, the values of 10% and 90% can be changed as appropriate to be set to 20% and 80%, 5% and 95%, or the like, respectively.

Furthermore, the conduction resistance of the switching element $sw_{ij}$ at the time of low resistance, that is, in the "on" state, needs to be lower than the reference value for low resistance, and the conduction resistance at the time of high resistance, that is, in the "off" state, needs to be higher than the reference value for high resistance. In MOSFET switching, when the current of the switching element $sw_{ij}$ or the voltage of the switching element $sw_{ij}$ is too large, the conduction resistance at the time of low resistance does not decrease to a desired value.

Also, in MOSFET switching, when the temperature of the switching element $sw_{ij}$ rises too much, the conduction resistance of the switching element $sw_{ij}$ may not decrease to a desired value at the time of low resistance. This may cause a state in which an appropriate switching operation cannot be implemented. The appropriate current range and the appropriate voltage range of the switching element $sw_{ij}$ can also be determined in consideration of the characteristics of the switching element $sw_{ij}$ as described above, for example.

On the other hand, the temperature of the switching element $sw_{ij}$ changes depending on the power of the switching element $sw_{ij}$, a repetition frequency of a pulse operation, and a duty ratio of the pulse operation. Here, the power of the switching element $sw_{ij}$ corresponds to a product of the current of the switching element $sw_{ij}$ and the voltage of the switching element $sw_{ij}$. Moreover, the duty ratio can be a value obtained by dividing an "on" time, which is a current passage time, by a sum of the "on" time and an "off" time, which is a current stop time, within one cycle of the pulse operation.

In addition to the current command cc and an estimated value of the output voltage, the control unit 1 may add various conditions such as the repetition frequency, the duty ratio, and the temperature of the switching element $sw_{ij}$ to the operating conditions, and may change the appropriate current range and the appropriate voltage range depending on the operating conditions. By adding these various conditions to the operating conditions, the control unit 1 can output the command signal $sig_{ij}$ reflecting the values of the various conditions.

The influence of the change in the switching time depending on the current or voltage of the switching element $sw_{ij}$ on an output current waveform is particularly remarkable in the case of the pulse operation. The influence is also remarkable when the pulse width of the output current is 1 microsecond or shorter, and is more remarkable when the pulse width is 500 nanoseconds or shorter. The influence is even more remarkable when the pulse width is 100 ns or shorter.

Besides the use of the MOSFET, the control unit 1 can be configured to determine the appropriate current range and the appropriate voltage range according to the type, specifications, or the like of the switching element $sw_{ij}$. In addition, silicon may be used as the material of a semiconductor used for the switching element $sw_{ij}$, or a wide gap semiconductor such as silicon carbide or gallium nitride may be applied to achieve high-speed, low-loss switching operation. Moreover, a high-temperature operation or the like of the switching element $sw_{ij}$ may be implemented.

Figure 4A:
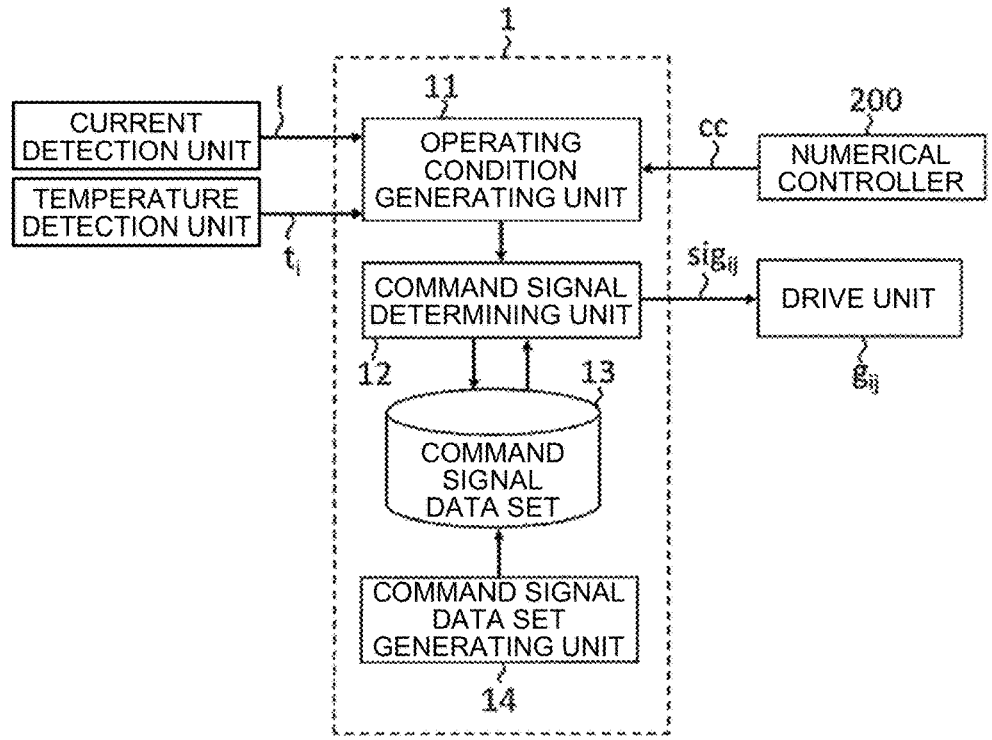
FIGS. 4A and 4B are block diagrams illustrating an example of a configuration of a control unit according to the first embodiment.
Figure 4B:
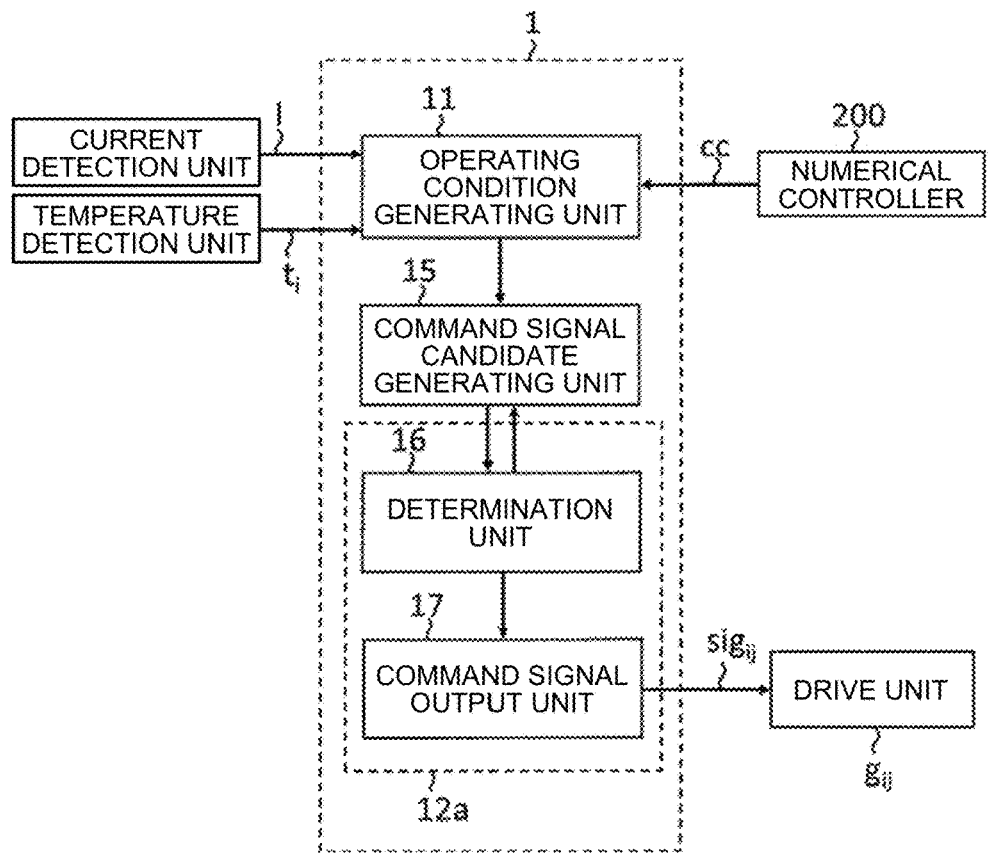

An example of a configuration of the control unit 1 will be further described. FIGS. 4A and 4B are block diagrams illustrating an example of the configuration of the control unit 1 according to the first embodiment. FIGS. 5A and 5B are flowcharts illustrating an example of an operation of the control unit 1 according to the first embodiment. The operation of the configuration illustrated in FIG. 4A is illustrated in FIG. 5A, and the operation of the configuration illustrated in FIG. 4B is illustrated in FIG. 5B.

The operating condition generating unit 11 in FIGS. 4A and 4B will be described. The operating condition generating unit 11 acquires in advance, as output data, the executed command signal and the detected current value I for the current generated by the executed command signal. Then, the output voltage for the operation to be executed is estimated from the output data and the current command cc for the operation to be executed.

Here, the impedance of the electrical load device 300 and the switching characteristics of the switching element $sw_{ij}$ change depending on the current, the voltage, and the like at each moment. Furthermore, the impedance of the electrical load device 300 or the performance of the switching element $sw_{ij}$ has individual differences or variations among elements having the same specifications or devices having the same specifications. Therefore, in a case where the command signal $sig_{ij}$ is generated only on the basis of the current command cc, the output current waveform may greatly deviate from the current command cc. In the present embodiment, the output voltage or the impedance of the electrical load device 300 is estimated on the basis of the output data, so that the operating conditions can be generated accurately with respect to the current command cc.

Next, a command signal data set generating unit 14 that generates a command signal data set 13 will be described. The command signal data set 13 is a set of an operating range and an intra-data command signal. The operating range is a numerical range that groups possible values of each of the operating conditions of the power supply device. The intra-data command signal specifies the command signal $sig_{ij}$ to be output when the operating condition is included in the operating range.

Here, the intra-data command signal is determined so as to satisfy the following condition. The condition is as follows. When the command signal $sig_{ij}$ specified by the intra-data command signal corresponding to the operating range is output, the current and the voltage per switching element $sw_{ij}$ are included in the appropriate current range and the appropriate voltage range, respectively.

FIGS. 6A and 6B are tables illustrating an example of the command signal data set 13 according to the first embodiment. As illustrated in FIGS. 6A and 6B, the intra-data command signal may specify the number of parallel circuits $p_i$ to be driven and the number of switching elements $sw_{ij}$ to be driven inside the parallel circuit $p_i$ to be driven. The intra-data command signal including the drive information makes it possible to configure the control unit 1 that exhibits an effect similar to that when the command signal $sig_{ij}$ includes the drive information as described above.

FIGS. 6A and 6B illustrate, as the operating ranges, ranges of numerical values for the pulse width of the output current, the peak value of the output current, the peak value of the output voltage, and the temperature of the switching element $sw_{ij}$. In the example of FIGS. 6A and 6B, a pulse width of 50 nanoseconds or longer and shorter than 100 nanoseconds is achieved, and the conduction resistance falls below a desired value at the time of low resistance and exceeds a desired value at the time of high resistance. Upper limits of the appropriate current range and the appropriate voltage range per switching element $sw_{ij}$ for satisfying this condition are assumed to be 20 amperes and 1 kilovolt, respectively. A condition is also defined for the temperature, where it is assumed that the above condition is satisfied when the temperature of the switching element $sw_{ij}$ is 20 degrees Celsius or higher and 50 degrees Celsius or lower.

On the basis of the above assumption, the intra-data command signal corresponding to the operating ranges in FIG. 6A drives 20 stages of the parallel circuits $p_i$ and five columns of the series circuits $s_i$ inside the parallel circuit $p_i$. On the other hand, the intra-data command signal for driving four columns of the series circuits $s_i$ corresponds to the operating ranges in FIG. 6B. The difference between the intra-data command signals of FIGS. 6A and 6B is caused by the difference in the item of the peak current value.

The repetition frequency or the duty ratio may be further added to the items of the operating range in FIGS. 6A and 6B, and, for example, in the operating range in which the repetition frequency or the duty ratio is high, the intra-data command signal may be determined by lowering the appropriate current range in consideration of an increase in the temperature of the switching element $sw_{ij}$.

In addition, the intra-data command signal of FIGS. 6A and 6B specifies the parallel circuits $p_i$ to be driven and the series circuits $s_{ij}$ inside the parallel circuit $p_i$ to be driven. A charge amount or a charge voltage of the capacitor $c_{ij}$ is not specified assuming that charging is performed such that the voltage obtained by equally dividing the output voltage among the plurality of parallel circuits $p_i$ is the voltage across one parallel circuit $p_i$. Only the series circuit $s_{ij}$ to be driven may be specified as the intra-data command signal. Also, the charger $ch_{ij}$ or the capacitor $c_{ij}$ may be specified, and the charge amount or the charge voltage thereof may be specified.

Next, an operation of a command signal determining unit 12 will be described. The command signal determining unit 12 extracts, from the command signal data set 13, the operating range in which the operating condition generated by the operating condition generating unit 11 is included in the numerical range thereof. Then, the intra-data command signal corresponding to the extracted operating range is output to the drive unit $g_{ij}$ as the command signal $sig_{ij}$.

Processing of the control unit 1 illustrated in FIG. 5A will now be described. In step S101, the operating conditions are grouped into numerical ranges so that operating ranges are generated. Moreover, an intra-data command signal corresponding to each of the operating ranges is determined. Then, the command signal data set 13 is generated by combining the operating range and the intra-data command signal corresponding to the operating range as a set. Step S101 corresponds to the operation of the command signal data set generating unit 14 in the case of the configuration of FIG. 4A.

Next, in step S102, an operating condition of an operation to be executed is generated on the basis of output data of an operation already executed and the current command cc for the operation to be executed. Step S102 corresponds to the operation of the operating condition generating unit 11 in the case of the configuration of FIG. 4A.

Next, in step S103, the operating range that includes the operating condition generated in step S102 is extracted from the command signal data set 13. Moreover, the intra-data command signal corresponding to the extracted operating range is output to the drive unit $g_{ij}$ as the command signal $sig_{ij}$. Step S103 corresponds to the operation of the command signal determining unit 12 in the case of the configuration of FIG. 4A. The operation of the control unit 1 illustrated in FIG. 4A has been described.

Here, the intra-data command signal and the command signal $sig_{ij}$ may include the drive information. Then, the command signal data set generating unit 14 may determine the intra-data command signal by associating the operating condition with the voltage and the current per switching element $sw_{ij}$ according to the drive information and reflecting the characteristic of the switching element.

Alternatively, the command signal data set generating unit 14 may determine the intra-data command signal as follows. That is, in a case where the operating condition is included in a certain operating range, the command signal data set generating unit 14 outputs the intra-data command signal corresponding to this operating range as the command signal $sig_{ij}$, so that the values of the current and the voltage per switching element $sw_{ij}$ are included in the appropriate current range and the appropriate voltage range, respectively.

Here, steps S101 and S102 can be performed by switching the order thereof. If step S101 is completed before the processing of step S103 is started, step S103 can be performed without waiting for the generation of the command signal data set 13 after step S102, so that the time required for the processing can be reduced.

If the processing of step S101 is executed after the processing of step S102, the command signal data set 13 can be generated according to the operating condition and for a wide range of the operating conditions. It is also possible to reduce a load on a storage device that stores the command signal data set 13.

Moreover, the operating range that is frequently used is stored in the command signal data set 13 by performing the processing of step S101 before step S102. On the other hand, the operating range that is used less frequently is generated according to the operating condition by executing the processing of step S101 after execution of the processing of step S102. The control unit 1 may be configured as described above.

The command signal data set 13 can also be data stored in a storage device. Moreover, the command signal data set generating unit 14 may be provided outside the control unit 1. Furthermore, the command signal data set 13 may be generated by an operator in place of the command signal data set generating unit 14. In addition, the control unit 1 may include an input unit and a storage device that stores the command signal data set 13, and generate the command signal data set 13 by inputting data from the input unit to the control unit 1 and storing the data in the storage device.

Next, the configuration and operation of the control unit 1 illustrated in FIGS. 4B and 5B will be described. The operation and configuration of the operating condition generating unit 11 in FIG. 4B are the same as those in FIGS. 4A and 5A. A command signal candidate generating unit 15 in FIG. 4B generates a candidate for the command signal $sig_{ij}$ as a command signal candidate. A single or plurality of command signal candidates may be generated.

The command signal candidate may also be generated according to the operating condition generated by the operating condition generating unit 11. The command signal candidate may be generated such that the current value and the voltage value of the switching element $sw_{ij}$ are included in the appropriate current range and the appropriate voltage range, respectively, but may be generated irrespective of the operating condition. Alternatively, the command signal candidate generating unit 15 may be omitted, and a fixed command signal candidate independent of the operating condition may be used.

A command signal determining unit 12a in FIG. 4B includes a determination unit 16 and a command signal output unit 17. The determination unit 16 determines whether the command signal candidate satisfies a predetermined criterion. Here, the command signal candidate and the command signal $\text{sig}_{ij}$ may include the drive information. The determination unit 16 may also associate the operating condition with the voltage and the current per switching element $\text{sw}_{ij}$ using the drive information. The determination unit 16 can thus perform the determination while reflecting the characteristic of the switching element by using the drive information.

Moreover, when a certain command signal candidate is output as the command signal $\text{sig}_{ij}$ under the acquired operating condition, the current and voltage values per switching element $\text{sw}_{ij}$ are included in the appropriate current range and the appropriate voltage range, respectively. In such a case, it may be determined that the command signal candidate satisfies the criterion.

In the determination of the command signal determining unit 12*a* in FIG. 4B, when only one command signal candidate satisfying the criterion is output, the command signal candidate satisfying the criterion is output to the drive unit $g_{ij}$ as the command signal $\text{sig}_{ij}$. On the other hand, when it is determined that a plurality of the command signal candidates satisfy the criterion, processing may be performed to select the best command signal candidate from among the command signal candidates satisfying the criterion. The selected command signal candidate may then be output to the drive unit $g_{ij}$ as the command signal $\text{sig}_{ij}$.

Here, the command signal candidate may include only information on the row number and the column number of the series circuit $s_{ij}$ to be driven. Then, after the command signal candidate is selected by the processing of the determination unit 16, the charge amount of the capacitor $c_{ij}$ may be calculated using the row number and the column number of the selected command signal candidate and the operating condition, and the command signal candidate may be output as the command signal $\text{sig}_{ij}$ including the calculated charge amount. Alternatively, the command signal candidate may include the charge amount of the capacitor $c_{ij}$.

Next, processing of the control unit 1 in the flowchart of FIG. 5B will be described. Processing illustrated in step S201 of FIG. 5B is the same as the processing of step S102 in FIG. 5A. Next, in step S202, a command signal candidate is generated for the operating condition generated in step S201. The command signal candidate generating unit 15 in FIG. 5B generates the command signal candidate corresponding to the operating condition. Next, in step S203, it is determined whether or not the command signal candidate is within a criterion range.

If it is determined in step S203 that the command signal candidate is out of the criterion range, the processing returns to step S202, and the command signal candidate is generated again. On the other hand, if it is determined in step S203 that the criterion is satisfied, the processing proceeds to step S204, and it is determined whether or not the command signal candidate is the best among the command signal candidates generated. Here, if there is only one command signal candidate satisfying the criterion, it is determined that this command signal candidate satisfying the criterion is the best.

If it is determined in step S204 that the command signal candidate is the best among the command signal candidates generated, the processing proceeds to step S205, and the command signal candidate determined to be the best is output to the drive unit $g_{ij}$ as the command signal $\text{sig}_{ij}$. On the other hand, if it is determined that the command signal candidate is not the best among the command signal candidates generated, the processing returns to step S204, and a determination is performed on a command signal candidate different from the command signal candidate that satisfies the criterion and is not the best.

Then, the determination in step S204 is repeated until it is determined that the command signal candidate is the best command signal candidate. Step S204 can be omitted as a configuration in which only one command signal candidate is generated in step S202. Here, the best command signal candidate may be the one having the shortest switching time. Moreover, steps S203 and S204 may be executed in a different order. The processing of the control unit 1 in the flowchart of FIG. 5B has been described.

A processor or processing circuitry may be used as the operating condition generating unit 11, the command signal determining unit 12, the command signal data set generating unit 14, the command signal candidate generating unit 15, the determination unit 16, and the command signal output unit 17 included in the control unit 1. A hardware configuration of the operating condition generating unit 11 will be described as an example of a hardware configuration of these components.

FIG. 7 is a diagram illustrating an example of the hardware configuration of the operating condition generating unit 11 according to the first embodiment. In FIG. 7, the operating condition generating unit 11 includes a processor 1101 as an information processing unit and a memory 1102 as a storage unit that stores information. The processor 1101 and the memory 1102 are, for example, a part of a computer. A program is installed in the memory 1102.

The program is installed via a network or from a storage medium storing information, for example. The program may include a program for performing the processing of acquiring the executed command signal and the detected current value I, and the processing of estimating the output voltage. The processor 1101 generates the operating condition by executing the program stored in the memory 1102.

The operating condition generating unit 11 may be entirely or partially configured by a control circuit including a semiconductor integrated circuit. The memory 1102 may include various storage devices such as a semiconductor storage device, a hard disk device, and a device that records information on a removable recording medium. The example of the hardware configuration of the operating condition generating unit 11 has been described above.

In addition, as the components listed above, a combination of a processor or processing circuitry and a storage device or the like may be used. The storage device may store a program or data. Moreover, a part or all of the components of the control unit 1 may be a computer including a processor and a storage device connected to the control target 3 via a network.

In addition, the processing of step S101 in FIG. 5A generates data stored in a lookup table as the command signal data set 13 in advance. Then, in step S103, the operating range including the operating condition of the operation to be executed is extracted from the lookup table. Furthermore, the intra-data command signal corresponding to the extracted operating range is extracted from the lookup table. The extracted intra-data command signal may then be output as the command signal $\text{sig}_{ij}$.

Furthermore, the processing illustrated in FIGS. 5A and 5B may be implemented by operating software, firmware, or a combination thereof by a processor or a processing circuitry. The software or firmware may be described as a program and stored in a storage device, so that the program stored in the storage device may be read and executed. Moreover, the series of processings in FIG. 5A or 5B may be implemented by using one dedicated processing circuitry, or a dedicated processing circuitry may be provided for each processing so that each processing may be implemented by a corresponding dedicated processing circuitry. Examples of the dedicated processing circuitry include a single circuit, a complex circuit, a programmed processor, a parallel-programmed processor, an application specific integrated circuit (ASIC), a field programmable gate array (FPGA), a combination of those, and the like.

Examples of the storage device include a semiconductor memory, a magnetic disk, a flexible disk, an optical disc, a compact disc, a mini disc, a digital versatile disc (DVD), and the like. Here, the semiconductor memory may be non-volatile or volatile.

According to the present embodiment, the control unit 1 generates the operating condition of the operation to be executed on the basis of the output data for the operation already executed and the current command cc for the operation to be executed, and determines the command signal $sig_{ij}$ for the operation to be executed on the basis of the operating condition. Therefore, even when there is a variation or an individual difference in the impedance of the electrical load device 300 or the characteristic of the switching element $sw_{ij}$, the variation and the individual difference can be reflected in the command signal $sig_{ij}$ for the next operation through the output data.

Moreover, when the command signal $sig_{ij}$ includes the drive information, the drive information can associate the operating condition with the current value and the voltage value per switching element. The characteristic of the switching element can thus be reflected in determining the command signal $sig_{ij}$ to be output.

The control unit 1 may determine the command signal $sig_{ij}$ such that the current value and the voltage value per switching element $sw_{ij}$ are included in the appropriate current range and the appropriate voltage range, respectively. Furthermore, the appropriate current range and the appropriate voltage range may be determined such that the switching time of the switching element $sw_{ij}$ is shorter than or equal to the reference switching time, and the value of the conduction resistance of the switching element $sw_{ij}$ is smaller than the reference value for low resistance at the time of low resistance, and larger than the reference value for high resistance at the time of high resistance. As a result, the command signal $sig_{ij}$ can be determined such that the current value and the voltage value per switching element take values that enable an appropriate switching operation.

As described above, the present embodiment can provide the power supply device capable of supplying power having a desired time waveform to the electrical load device without requiring long adjustment by an operator.

Second Embodiment

Figure 8:
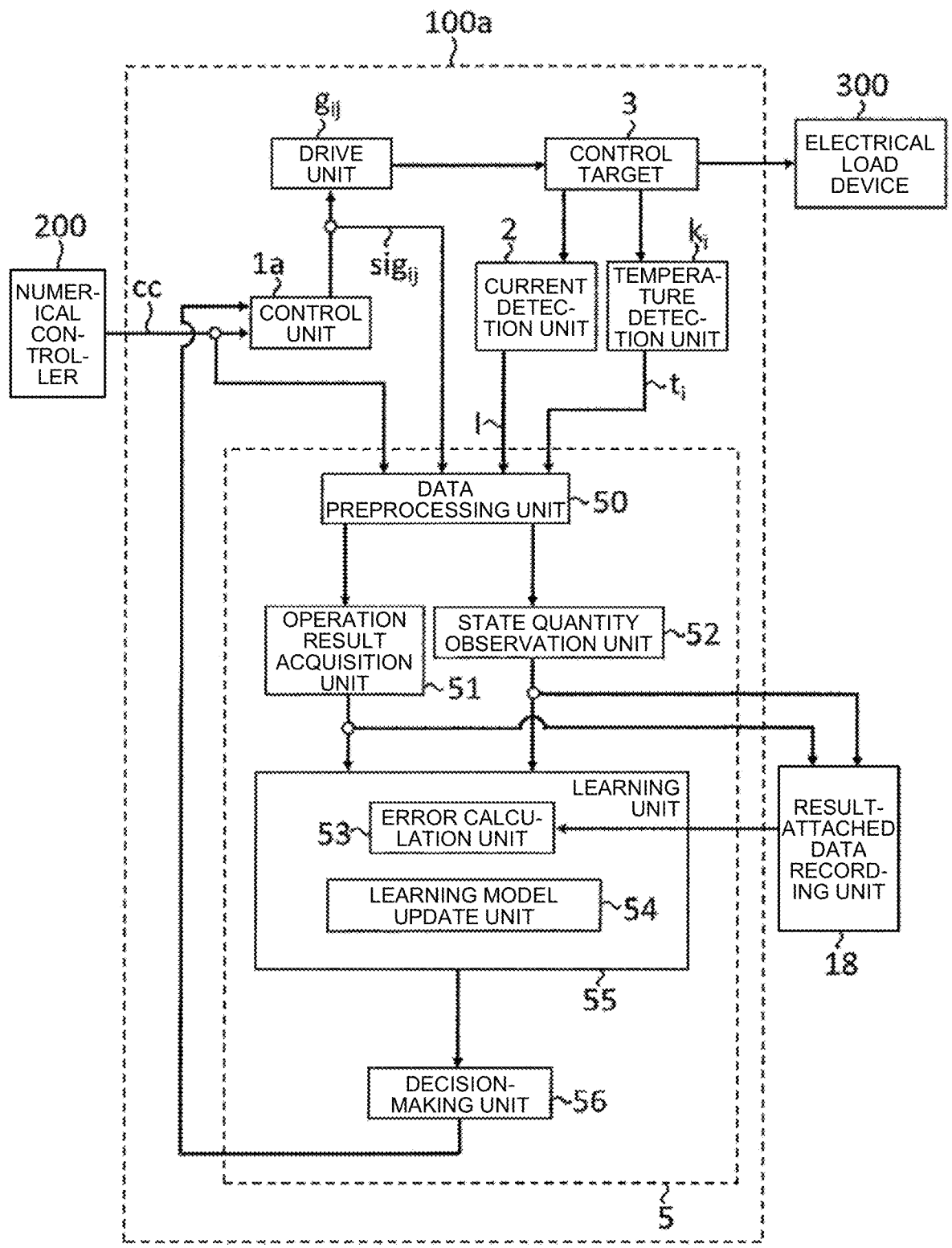
FIG. 8 is a block diagram illustrating an example of a configuration of a power supply device according to a second embodiment.

FIG. 8 is a block diagram illustrating an example of a configuration of a power supply device 100a according to a second embodiment. The power supply device 100a is different from the power supply device 100 of the first embodiment in that the power supply device 100a includes a machine learning device 5 and includes a control unit 1a instead of the control unit 1. In the description of the present embodiment, components identical or corresponding to those in the first embodiment are denoted by the same reference numerals as those in the first embodiment.

The machine learning device 5 will be described. The machine learning device 5 includes a data preprocessing unit 50, an operation result acquisition unit 51, a state quantity observation unit 52, a learning unit 55, and a decision-making unit 56. A result-attached data recording unit 18 is further provided outside the power supply device 100a. The data preprocessing unit 50 performs preprocessing of converting an external signal such as the current command cc, the command signal $sig_{ij}$, the detected temperature signal $t_i$, or the detected current value I into data that is readily used, and outputs the data to the operation result acquisition unit 51 and the state quantity observation unit 52.

The arrangement of the data preprocessing unit 50 is not limited to the configuration of FIG. 8. For example, when it is desired to perform preprocessing only on the output data from the temperature detector $k_i$, the data preprocessing unit 50 may be provided on a path through which the output data from the temperature detector $k_i$ input to the state quantity observation unit 52 passes. Alternatively, the data preprocessing unit 50 can be omitted if the operation result acquisition unit 51 and the state quantity observation unit 52 include the function of preprocessing.

The operation result acquisition unit 51 acquires the detected current value I from the data preprocessing unit 50, and outputs an output result to the result-attached data recording unit 18 or the learning unit 55. The output result of FIG. 8 may be the detected current value I. The state quantity observation unit 52 acquires a measurement result, a signal, or the like related to the power supply device 100a or the electrical load device 300 and outputs a state quantity, where the data preprocessing unit 50 may perform preprocessing on the acquired measurement result, signal, or the like.

The state quantity observation unit 52 in FIG. 8 acquires the current command cc, the command signal $sig_{ij}$, and the detected temperature signal $t_i$, and outputs state quantities to the learning unit 55 or the result-attached data recording unit 18. The state quantities in FIG. 8 can be, for example, the current command cc, the command signal $sig_{ij}$, the detected temperature signal $t_i$, and the detected current value I.

The learning unit 55 acquires the output result from the operation result acquisition unit 51 or the result-attached data recording unit 18, and acquires the state quantities from the state quantity observation unit 52 or the result-attached data recording unit 18. The learning unit 55 further learns the command signal $sig_{ij}$ in association with the state quantities and the output result, and outputs a learned result to the decision-making unit 56.

Examples of the learned result include a candidate of the command signal $sig_{ij}$, a condition to be satisfied by the command signal $sig_{ij}$, and the like. These may be determined for each operating condition described in the first embodiment. Here, the state quantity observation unit 52 and the operation result acquisition unit 51 may automatically observe the state quantities and the output result of the power supply device 100a without the intervention of an operator, but some or all of the operations may depend on the operation, observation, or input by an operator.

The decision-making unit 56 may determine the command signal $sig_{ij}$ with reference to the learned result output by the learning unit 55, and output the determined command signal $sig_{ij}$ to the control unit 1a. For example, the learning unit 55 may output a plurality of candidates for the command signal $sig_{ij}$ as learning result data, and the decision-making unit 56 may determine the command signal $sig_{ij}$ from among the candidates for the command signal $sig_{ij}$.

The learning unit 55 will be described in more detail. The learning unit 55 includes an error calculation unit 53 and a learning model update unit 54. The error calculation unit 53 calculates an error between the detected current value I and the current command cc. The learning model update unit 54 updates a learning model according to the error calculated by the error calculation unit 53. Here, the error need only be a difference between an output result and a target value of the output result, and is not limited to the error between the detected current value I and the current command cc. For example, the error may be a difference between a target value and a measured value of the output voltage. A difference between the detected value d of each unit and a target value thereof may be selected as appropriate and set as the error such that each unit of the power supply device 100a follows the target value.

The learning model will be described. The learning unit 55 may have a plurality of learning models for learning the command signal $sig_{ij}$, or may have a different learning model for each output condition. The output condition can be, for example, the type of the electrical load device 300, the specifications of the current pulse included in the current command cc, or the like. Here, the specifications of the current pulse can include, for example, a frequency, a current peak value, and a pulse width.

Moreover, when the detected current value I acquired as the output result from the operation result acquisition unit 51 exceeds a predetermined level while the current is being generated on the basis of the command signal $sig_{ij}$, the error calculation unit 53 may output a calculation result indicating that a predetermined error has occurred in the output result of the command signal $sig_{ij}$. The learning model update unit 54 may then update the learning model according to the calculation result indicating that the error has occurred.

Figure 9:
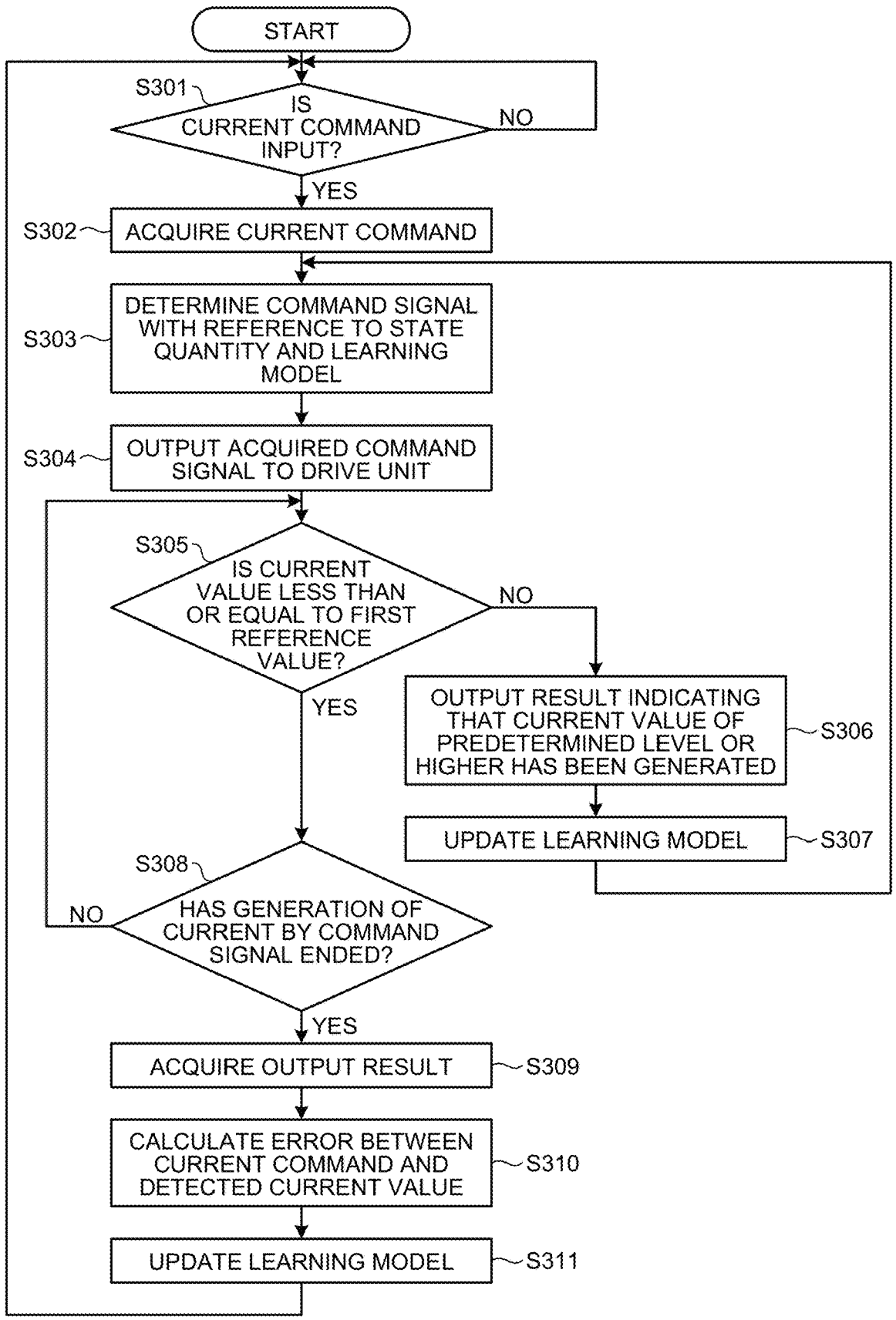
FIG. 9 is a flowchart illustrating an example of an operation of a machine learning device according to the second embodiment.

FIG. 9 is a flowchart illustrating an example of an operation of the machine learning device 5 according to the second embodiment. The machine learning device 5 illustrated in FIG. 9 applies supervised learning in which the command signal $sig_{ij}$ as the input and the detected current value I as the output result are given in pairs.

As illustrated in FIG. 9, when a learning operation is started in the machine learning device 5, first, it is determined in step S301 whether or not the current command cc is input to the power supply device 100a. If it is determined in step S301 that there is no input of the current command cc, the processing of step S301 is performed again after a certain period of time. If it is determined in step S301 that the current command cc is input, the machine learning device 5 acquires the current command cc in step S302.

Moreover, in step S303, the command signal $sig_{ij}$ is determined with reference to a learning model corresponding to the latest state quantity of the power supply device 100a acquired, and is output to the control unit 1a. Next, in step S304, the control unit 1a outputs the command signal $sig_{ij}$ to the drive unit $g_{ij}$. The drive unit $g_{ij}$ controls the charger $ch_{ij}$ and the switching element $sw_{ij}$ on the basis of the command signal $sig_{ij}$, and causes a current to be output to the electrical load device 300.

While the current is flowing through the electrical load device 300, the detected current value I is observed and monitored as to whether the detected current value I being detected does not exceed a first reference value that is a predetermined level. The operation of monitoring the detected current value I is described in step S305 of FIG. 9. If it is determined in step S305 that the detected current value I exceeds the first reference value, a result indicating that a predetermined error has occurred is output in step S306. Then, in step S307, the learning model is updated according to the error being output. The processing then returns to step S303 to determine the next command signal $sig_{ij}$.

If it is not determined in step S305 that the detected current value I exceeds the first reference value, it is determined in step S308 whether or not the generation of the current by the command signal $sig_{ij}$ output from the machine learning device 5 has ended. If the generation of the current has not ended, the processing returns to step S305 to continue the generation of the current and the monitoring of the detected current value I. If it is determined in step S308 that the generation of the current by the command signal $sig_{ij}$ has ended, the detected current value I is received as the output result in step S309.

Furthermore, in step S310, an error between the current command cc and the detected current value I for the current output on the basis of the current command cc is calculated. Then, in step S311, the learning model is updated according to the calculated error. The processing then returns to step S301 to execute the flow from step S301 to step S311 again. By repeating the flow from step S301 to step S311, the learning unit 55 learns the command signal $sig_{ij}$ by repeating the update of the learning model.

FIG. 8 illustrates the power supply device 100a including the machine learning device 5 that performs supervised learning. A learning method by supervised learning will be briefly described. As an example of learning by supervised learning, for example, a regression equation of a prediction model as in expression (1) may be set.

[Expression 1]
$$y = a_0 + a_1 x_1 + a_2 x_2 + a_2 x_2 + a_3 x_3 + \cdots + a_n x_n \qquad (1)$$

Then, in the process of learning, the machine learning device may proceed with the learning by adjusting values of a coefficient $a_0$ to a coefficient $a_n$ such that a value of a target variable y is obtained when values taken by a state variable $x_1$ to a state variable $x_n$ are applied to the regression equation. Note that the learning method is different for each supervised learning algorithm. In addition to the learning method described using expression (1), various methods such as a neural network, a least squares method, and a stepwise method can be used as the supervised learning algorithm.

Figure 10:
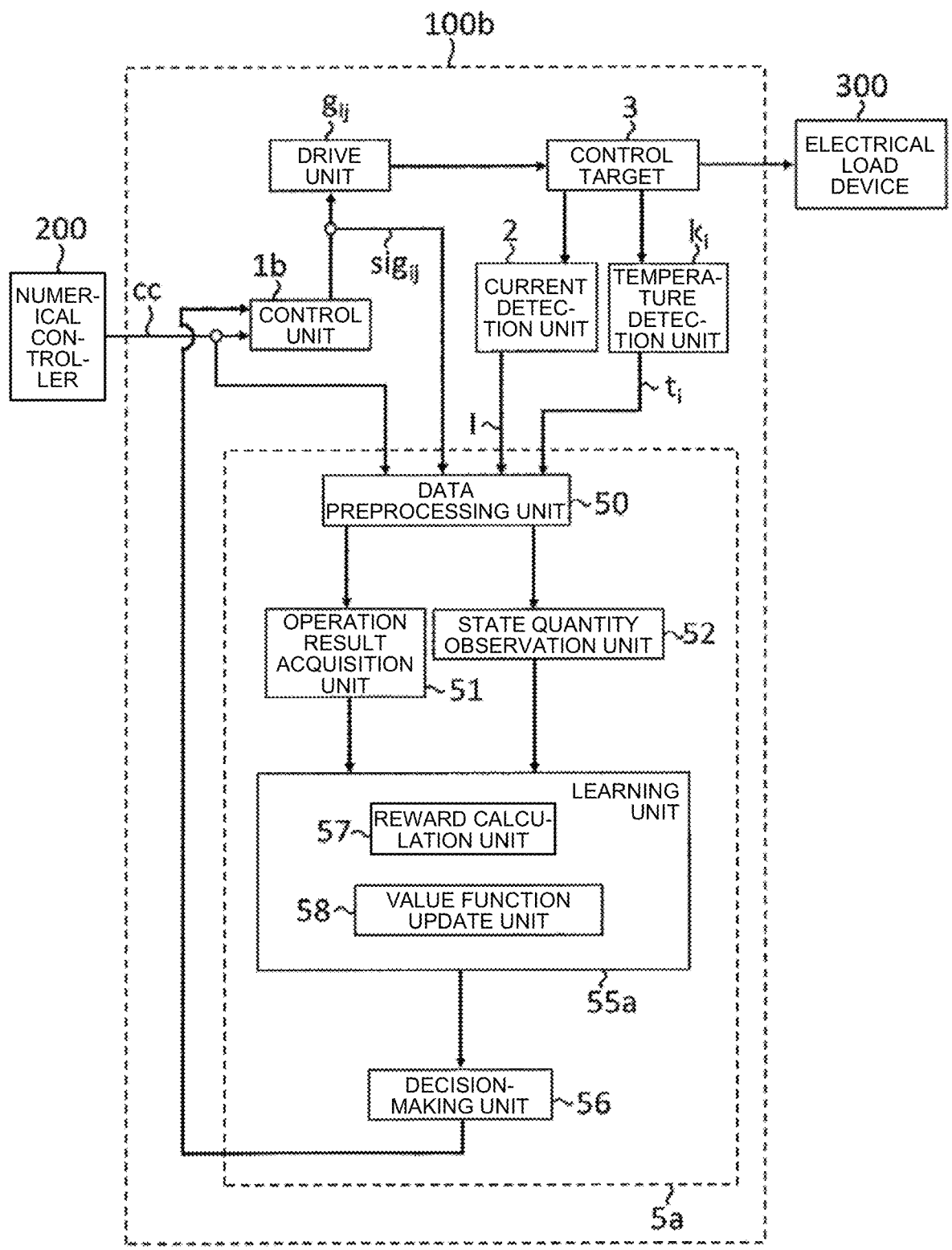
FIG. 10 is a block diagram illustrating an example of a configuration of a power supply device according to the second embodiment.

Next, an example of a power supply device including a machine learning device that performs reinforcement learning will be described. FIG. 10 is a block diagram illustrating an example of a configuration of a power supply device 100b according to the second embodiment. A machine learning device 5a illustrated in FIG. 10 applies reinforcement learning. Supervised learning is considered to be suitable when a large number of input and output pairs are given. On the other hand, reinforcement learning has a characteristic that an unknown learning region can be found. Therefore, by performing reinforcement learning at a stage where a certain amount of learning has been performed using supervised learning, there is a possibility that a better command signal $sig_{ij}$ can be found in a region that has not been known at all.

The power supply device 100b of FIG. 10 is different from the power supply device 100a in that a control unit 1b is included instead of the control unit 1a, a machine learning device 5a is included instead of the machine learning device 5, and the result-attached data recording unit 18 is not provided. Moreover, the machine learning device 5a is different from the machine learning device 5 in that a learning unit 55a is included instead of the learning unit 55. The learning unit 55a includes a reward calculation unit 57 and a value function update unit 58. In the description of the power supply device 100*b*, components identical or corresponding to those of the power supply device 100 or 100*a* will be denoted by the same reference numerals as those in the power supply device 100 or 100*a*.

The reward calculation unit 57 calculates a difference between an output result and a target value of the output result for each command signal $sig_{ij}$. For example, the output result may be the detected current value I, and the target value may be the current command cc. When the difference is smaller than a threshold, a positive reward is given according to how small the difference is. When the difference is larger than the threshold, a negative reward is given according to how large the difference is. The value function update unit 58 updates a value function according to the reward given by the reward calculation unit 57. The value function update unit 58 may update the value function so as to obtain a reward as high as possible.

Figure 11:
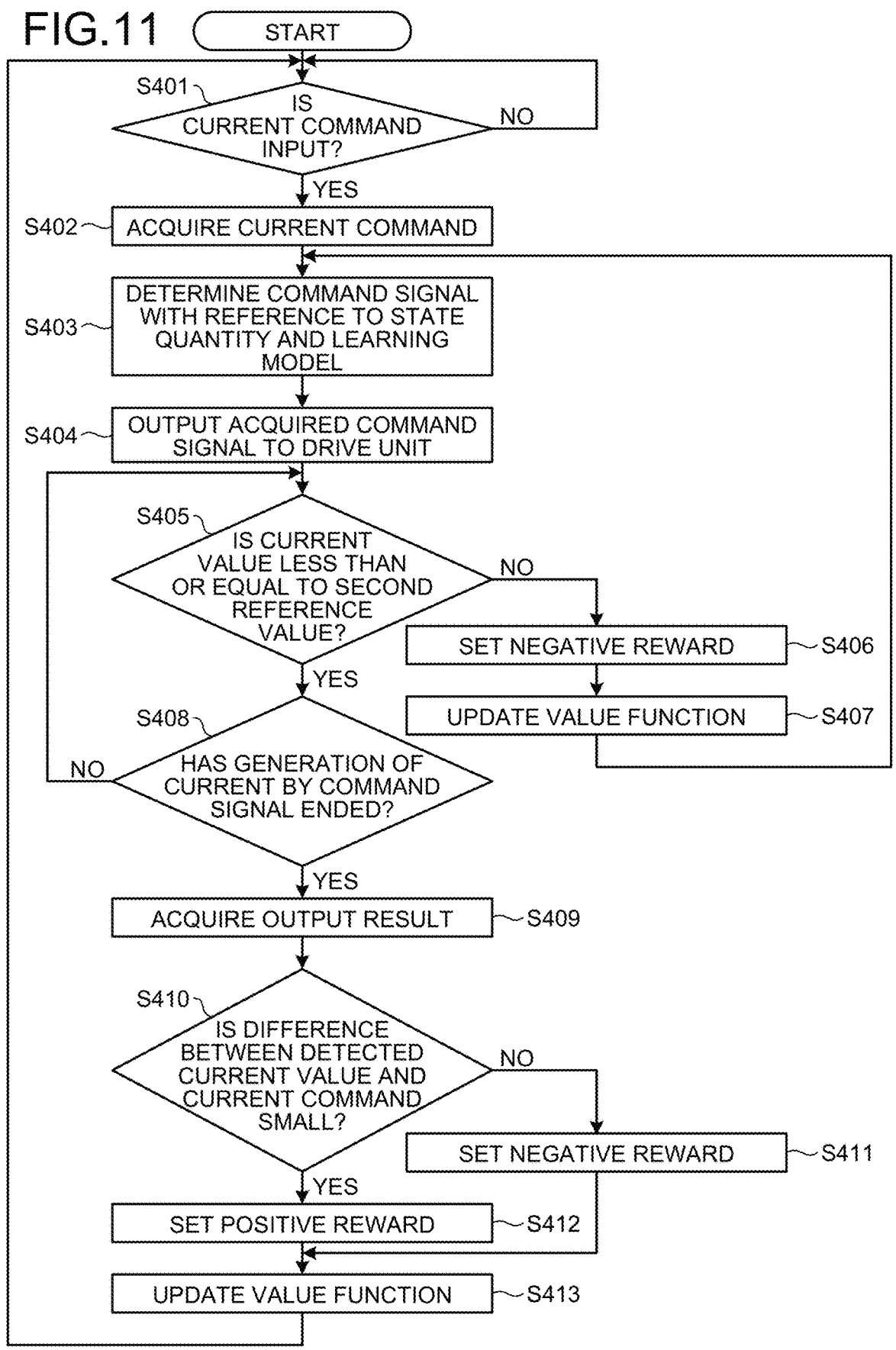
FIG. 11 is a flowchart illustrating an example of an operation of a machine learning device according to the second embodiment.

FIG. 11 is a flowchart illustrating an example of an operation of the machine learning device 5*a* according to the second embodiment. When the operation is started, it is determined in step S401 whether or not the current command cc is input to the power supply device 100*b*. Next, if it is determined that the current command cc is input, the current command cc is acquired in step S402. On the other hand, if it is determined that there is no input of the current command cc, step S401 is repeated after a lapse of a certain period of time.

Next, when the current command cc is acquired in step S402, in step S403, the machine learning device 5*a* determines the command signal $sig_{ij}$ with reference to the latest state quantity of the power supply device 100*b* and a value function corresponding to the current command cc, and outputs the command signal $sig_{ij}$ to the control unit 1*b*. Here, the learning unit 55*a* may include a plurality of value functions, and may also change the value function according to an output condition. The output condition is the same as that described with reference to FIGS. 8 and 9.

In step S404, the control unit 1*b* outputs the output command signal $sig_{ij}$ to the drive unit $g_{ij}$, so that a current is output from the power supply device 100*b* to the electrical load device 300. While the power supply device 100*b* outputs the current, the detected current value I is observed as an output result fed back in real time, and it is monitored whether the detected current value I being detected does not exceed a second reference value that is a predetermined level. This monitoring operation is described in step S405.

If it is determined in step S405 that the detected current value I exceeds the second reference value, a negative reward is given in step S406. Then, in step S407, the value function is updated according to the reward given in step S406. The processing thereafter returns to step S403 to determine the next command signal $sig_{ij}$.

If it is not determined in step S405 that the detected current value I exceeds the second reference value, it is determined in step S408 whether or not the generation of the current by the command signal $sig_{ij}$ being output, that is, the execution of the command signal $sig_{ij}$, has ended. The processing returns to step S405 to continue the output of the current until the execution of the command signal $sig_{ij}$ ends. Then, the monitoring of the detected current value I is continued.

If it is determined in step S408 that the execution of the command signal $sig_{ij}$ has ended, an output result is acquired in step S409. Next, in step S410, it is determined whether or not the magnitude of a difference between the output result and a target value is small. Here, the output result may be the detected current value I, and the target value may be the current command cc.

If the difference is small, a positive reward is given in step S412 according to how small the difference is. On the other hand, if the difference is large, a negative reward is given in step S411 according to how large the difference is. Here, it may be determined that the difference is large when the value of the difference exceeds a predetermined threshold, or that the difference is small when the value of the difference does not exceed the threshold.

Next, in step S413, the value function is updated according to the reward given. The processing then returns to step S401 to execute the flow from step S401 to step S413 again. By repeating the above steps, the machine learning device 5*a* continues to update the value function and learns the command signal $sig_{ij}$.

Next, a learning method by reinforcement learning will be described. Reinforcement learning is a learning method in which a subject as an agent acting in a certain environment observes a current state and determines an action to take. The agent receives a reward from the environment by choosing an action and learns a policy to receive the most rewards through a series of actions.

As representative methods of reinforcement learning, Q learning, TD learning, and the like are known. In the case of Q learning, for example, a general update expression (an action value table) of an action value function Q (s, a) is expressed by expression (2). In expression (2), "$s_t$" represents a state at time "t", and "$a_t$" represents an action at time "t".

[Expression 2]

$$Q(s_t, a_t) \leftarrow Q(s_t, a_t) + \alpha\left(r_{t-1} + \gamma\max_{a}Q(s_{t+1}, a) - Q(s_t, a_t)\right) \quad (2)$$

The state transitions to "$s_{t+1}$" by the action "$a_t$". Moreover, "$r_{t+1}$" represents a reward given by the change in the state, "γ" represents a discount factor, and "α" represents a learning rate. When Q learning is applied, the action $a_t$ corresponds to the command signal $sig_{ij}$. Hereinafter, modifications of the configurations of the machine learning device 5 and the machine learning device 5*a* and variations of the operation will be exemplified.

The power supply device 100*a* or the power supply device 100*b* may include an operating condition generating unit. Here, the operating condition generating unit generates the operating condition including the current command and the estimated value of the output voltage that is the voltage across the output terminals on the basis of the current command and the output data including the executed command signal, which is the command signal already executed for use in driving, and the detected current value of the current generated by the executed command signal. Then, the machine learning device 5 or the machine learning device 5*a* may learn or determine the command signal $sig_{ij}$ on the basis of the operating condition.

In addition, the command signal $sig_{ij}$ output from the machine learning device 5 or the machine learning device 5*a* may include the drive information. When the command signal $sig_{ij}$ includes the drive information, the operating condition can be associated with the current and the voltage per switching element $sw_{ij}$.

As a result, the characteristic that changes depending on the current or the voltage of each switching element $sw_{ij}$ or a combination thereof can be reflected in the command signal $sig_{ij}$ being output. Therefore, the current and the voltage of each switching element $sw_{ij}$ can be determined such that each switching element $sw_{ij}$ can exhibit desired switching performance.

For example, the reward calculation unit 57 may give a high reward when the switching time is less than or equal to the reference switching time, and may give a low reward when the switching time exceeds the reference switching time. This allows for the learning of the command signal $sig_{ij}$ with which the current value and the voltage value per switching element $sw_{ij}$ correspond to the switching operation with the switching time less than or equal to the reference. Then, the repetition of the learning makes it possible to quickly and accurately determine the command signal $sig_{ij}$ with which the switching operation has the switching time less than or equal to the reference.

Moreover, for example, the reward calculation unit 57 may give a high reward when the value of the conduction resistance of the switching element $sw_{ij}$ is smaller than the reference value for low resistance at the time of low resistance and larger than the reference value for high resistance at the time of high resistance, and give a low reward in other cases. This allows for the learning of the command signal $sig_{ij}$ with which the current value and the voltage value per switching element $sw_{ij}$ enable an appropriate switching operation. Then, the repetition of the learning makes it possible to quickly and accurately determine the command signal $sig_{ij}$ that enables the appropriate switching operation.

Moreover, in FIGS. 8 and 10, the machine learning devices 5 and 5a are provided outside the respective control units 1a and 1b, but may be provided inside the respective control units 1a and 1b. In addition, a learning result data storage unit that stores learning result data may be provided. Then, while the machine learning device 5 or 5a updates the stored learning result data, the control unit may output the command signal $sig_{ij}$ with reference to the learning result data stored in the learning result data storage unit.

Furthermore, the power supply device may include a learning result data storage unit without the machine learning device 5 or 5a. The control unit may output the command signal $sig_{ij}$ with reference to learning result data stored in the learning result data storage unit. As a result, when learning is not performed, the command signal $sig_{ij}$ reflecting the learning result can be output in a short time and with a small calculation load. Moreover, the learning result data can be applied to a power supply device other than the power supply device that has performed learning, so that the learning result data can be efficiently used.

Moreover, the command signal $sig_{ij}$ may be obtained by machine learning in association with the state quantity and the operation result including the state quantity and the operation result that change during the output of the current. As a result, a desired output current can be generated in response to the change during the output. In the electrical load device 300, a measurement result of a phenomenon that occurs due to the current output from the power supply device may be detected and used as a state quantity or an output result. Here, the phenomenon that occurs in the electrical load device 300 is, for example, a phenomenon such as discharge, laser oscillation, or plasma oscillation.

Moreover, the machine learning device 5 of FIG. 8 may include a plurality of learning models having different error distributions depending on output conditions such as a pulse shape, a pulse region, and a frequency, an operation mode, and the like with respect to the same command signal $sig_{ij}$ and output result. Similarly, the machine learning device 5a of FIG. 10 may include a plurality of value functions with different reward distributions depending on the output conditions, operation mode, and the like.

For example, the distribution of the magnitude of the error or the negative reward may be varied between the peak portion and the rising portion of the current pulse. Here, when the distribution of the magnitude of the error or the negative reward in the rising portion is set to be large, the learning focuses on the accuracy of following the current command cc in the rising portion. The distribution of the magnitude of the error or the negative reward can also be varied depending on the pulse width. For example, when the distribution of the magnitude of the error or the negative reward is increased for a pulse having a pulse width of 100 ns to 300 ns, the learning focuses on the accuracy of following the current command cc for the pulse having the pulse width of 100 ns to 300 ns.

Moreover, a display unit that displays learning result data, information based on the learning result data, the command signal $sig_{ij}$, and the like to an operator may be provided so that the operator can perform an operation reflecting the learning result data or the like output from the machine learning device 5 or 5a. Regarding the information based on the learning result data, for example, the operator may select the command signal $sig_{ij}$ from among candidates of the command signal $sig_{ij}$ output from the learning unit 55. Here, the display unit may be one that conveys information through vision such as a printer or a display, or may be one that conveys information through hearing such as a speaker.

Moreover, the machine learning devices provided in corresponding ones of a plurality of the power supply devices may share or exchange data with one another via a communication medium. The machine learning device may be provided outside the power supply device. Also, a plurality of the power supply devices may share one learning device. Here, a plurality of the power supply devices may share a single machine learning device via a communication medium.

Furthermore, the machine learning device may be provided on a cloud server to be able to not only share a learning effect, but also perform learning using a large-scale, high-performance processor by central control of data. A general-purpose computer or processor may be used for these machine learning devices. In addition, processing may be performed at high speed by applying general-purpose computing on graphics processing units (GPGP), a large-scale PC cluster, or the like.

Moreover, the machine learning method applied to the present embodiment is not limited to the two methods being supervised learning and reinforcement learning described in the present embodiment, and various methods such as supervised learning, unsupervised learning, semi-supervised learning, and reinforcement learning can be applied.

The power supply device of the present embodiment can output, to the drive unit $g_{ij}$, the command signal $sig_{ij}$ determined with reference to the result of learning the command signal $sig_{ij}$ in association with the state quantity and the operation result of the power supply device or the electrical load device 300. As a result, the power supply device can supply power having a desired waveform to the electrical load device without requiring long adjustment.

Moreover, the command signal $sig_{ij}$ can be obtained by machine learning in association with the state quantity and the operation result including the state quantity and the operation result that change during the output of the power supply device. As a result, the command signal $sig_{ij}$ can be determined by reflecting the change in the state quantity during the output, and the difference between the output result and the target value can be reduced more quickly.

Moreover, in the present embodiment, if many state quantities representing the state of the power supply device or the electrical load device 300 are observed, the learning can be performed without missing a difference in the output result due to a difference in the state. In addition, if data is shared or exchanged between the machine learning devices provided in the power supply device, the learning effect can be enhanced in a shorter time, and the command signal $sig_{ij}$ having high accuracy can be output in a shorter time. Moreover, if the learning device is provided on a cloud server, the learning speed and the learning accuracy can be efficiently improved. As a result, the command signal $sig_{ij}$ that is more appropriate can be output in a short time.

Third Embodiment

Figure 12:
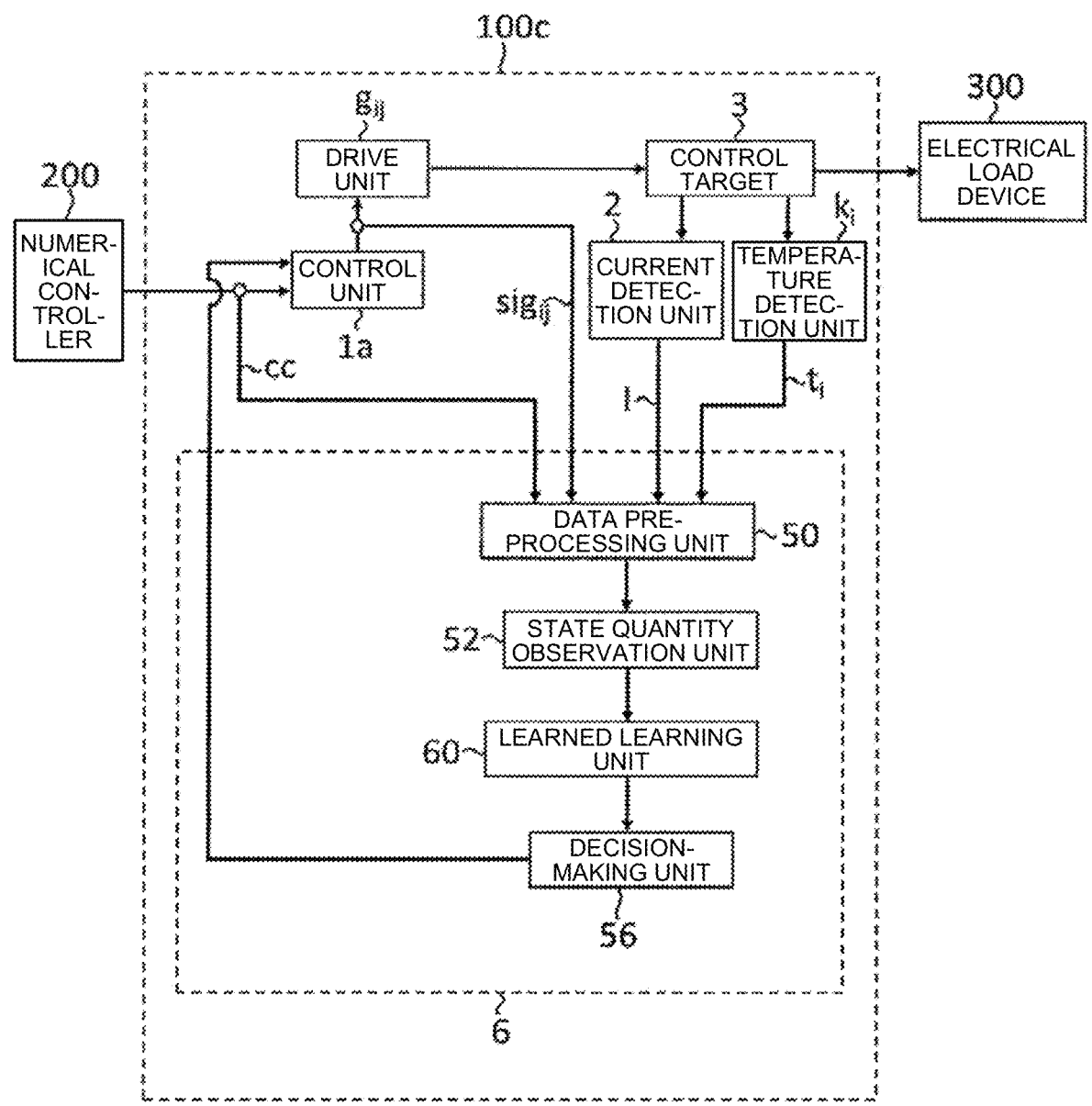
FIG. 12 is a block diagram illustrating an example of a configuration of a power supply device according to a third embodiment.

A power supply device 100c of the present embodiment includes a learned learning device 6 that has performed learning using the machine learning device 5 described in the second embodiment. FIG. 12 is a block diagram illustrating an example of a configuration of the power supply device 100c according to a third embodiment. In the present embodiment, components identical or corresponding to the components described in the first or second embodiment are denoted by the same reference numerals as those in the first or second embodiment.

The learned learning device 6 includes the data preprocessing unit 50, the state quantity observation unit 52, a learned learning unit 60, and the decision-making unit 56. The learned learning unit 60 includes a learned model that has been learned by the machine learning device 5, and outputs learning result data to the decision-making unit 56 on the basis of a state quantity by referring to the learned model. The decision-making unit 56 determines the command signal $sig_{ij}$ with reference to the learning result data output from the learned learning unit 60.

The command signal $sig_{ij}$ output from the learned learning device 6 may include the drive information. When the command signal $sig_{ij}$ includes the drive information, the operating condition can be associated with the current value and the voltage value per switching element $sw_{ij}$.

As a result, the characteristic that changes depending on the current or the voltage per switching element $sw_{ij}$ or a combination thereof can be reflected in the command signal $sig_{ij}$ being output. Therefore, the current value and the voltage value per switching element $sw_{ij}$ can be determined such that each switching element $sw_{ij}$ can exhibit desired switching performance.

Figure 13:
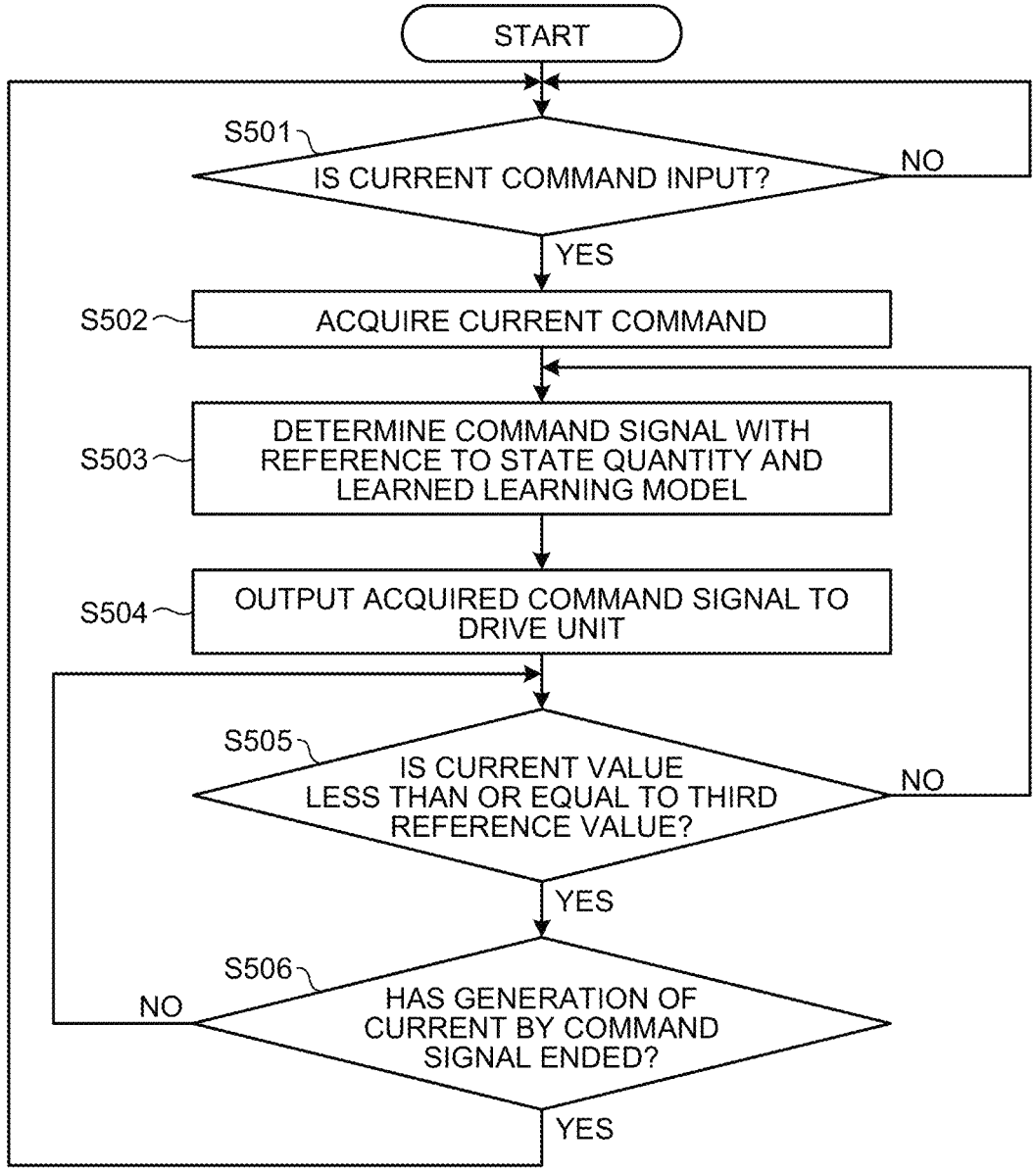
FIG. 13 is a flowchart illustrating an operation of a learned learning device according to the third embodiment.

FIG. 13 is a flowchart illustrating an operation of the learned learning device 6. The operation of the learned learning device 6 will be described with reference to FIG. 13. When the operation of the learned learning device 6 is started, it is first determined in step S501 whether or not the current command cc is input to the power supply device 100c. If the current command cc is input, the current command cc is acquired in step S502.

Moreover, in step S503, the command signal $sig_{ij}$ is determined from the state quantity with reference to a learning model corresponding to the latest state quantity of the power supply device 100c, and is output to the control unit 1a. Then, in step S504, the control unit 1a outputs the command signal $sig_{ij}$ to the drive unit $g_{ij}$. The drive unit $g_{ij}$ drives the charger $ch_{ij}$ and the switching element $sw_{ij}$ on the basis of the command signal $sig_{ij}$, so that a current flows to the electrical load device 300.

While the current is being output, the detected current value I is observed as an operation result fed back in real time, and it is monitored whether the detected current value I does not exceed a third reference value that is a predetermined level. The monitoring operation is described in step S505 of FIG. 13. If it is determined in step S505 that the detected current value I exceeds the third reference value, the processing returns to step S503 to determine the next command signal $sig_{ij}$.

If it is not determined in step S505 that the detected current value I exceeds the third reference value, it is determined in step S506 whether or not the generation of the current by the command signal $sig_{ij}$ has ended. Then, if it is not determined in step S506 that the generation of the current has ended, the processing returns to step S505 to continue the generation of the current and the monitoring of the detected current value I until the generation of the current by the command signal $sig_{ij}$ ends.

If it is determined in step S506 that the generation of the current by the command signal $sig_{ij}$ has ended, the processing returns to step S501 to execute the flow from step S501 to step S506 again. By repeating the flow from step S501 to step S506 as described above, the command signal $sig_{ij}$ is output from the learned learning device 6, and the control target 3 is controlled by the control unit 1a.

The power supply device may be manufactured using the learning result by the machine learning device 5 by mounting the learned learning device 6 on the power supply device. Alternatively, instead of the learned learning device 6, the power supply device may be equipped with a learned learning device that has performed learning by the machine learning device described in the second embodiment different from the machine learning device 5.

Alternatively, the power supply device may be manufactured using the learning result by the machine learning device described in the second embodiment different from the machine learning device 5. Moreover, it is not always necessary to provide one learned learning device in one power supply device, and one learned learning device may be shared by a plurality of power supply devices. The machine learning device described in the second embodiment different from the machine learning device 5 may be, for example, the machine learning device 5a.

The power supply device 100c of the present embodiment includes the learned learning device 6. Also, the power supply device can be manufactured using the learning result of machine learning by mounting the learned learning device 6 on the power supply device. As a result, the power supply device can output the command signal $sig_{ij}$ using the learning result and supply power having a desired current waveform to the electrical load device without requiring long adjustment.

The power supply device 100c of the present embodiment can output, to the drive unit $g_{ij}$, the command signal $sig_{ij}$ determined with reference to the result of learning the command signal $sig_{ij}$ in association with the state quantity and the operation result of the power supply device 100c. As a result, the power supply device 100c can supply power having a desired waveform to the electrical load device 300 without requiring a long time for the adjustment of the power supply device 100c.

Furthermore, since the learning operation is not performed inside the power supply device 100c, the command signal $sig_{ij}$ reflecting the learning result can be output with a smaller calculation load. It is also possible to output the command signal $sig_{ij}$ reflecting the learning result without performing learning for each power supply device. As a result, the power supply device can reflect the learning result in the command signal $sig_{ij}$ with a smaller load in a short time and supply power having a desired waveform with high accuracy.

The embodiments described above can be applied in combination.

REFERENCE SIGNS LIST 1, 1a, 1b, 1c control unit; 2 current detection unit; 6 learned learning device; 11 operating condition generating unit; 12, 12a command signal determining unit; command signal data set; 51 operation result acquisition unit; 52 state quantity observation unit; 53 error calculation unit; 54 learning model update unit; 55 learning unit; 57 reward calculation unit; 58 value function update unit; 60 learned learning unit; 100, 100a, 100b, 100c power supply device; 200 numerical controller; 300 electrical load device; $c_{ij}$ capacitor; $ch_{ij}$ charger; D detection device; d detected value; $g_{ij}$ drive unit; $k_i$ temperature detector; MSSC multistage series circuit; $M_i$ module; $sig_{ij}$ command signal; $s_{ij}$ series circuit; $p_i$ parallel circuit; $sw_{ij}$ switching element; $t_i$ detected temperature signal; $T_i$ transformer.

The invention claimed is:

1. A power supply device comprising:
"m×n" switching elements (where "m" and "n" are integers of 2 or greater);
"m×n" capacitors connected in series to corresponding ones of the switching elements and forming "m×n" series circuits;
a charger to charge the capacitors;
"m" transformers in which both ends of each primary winding are connected to both ends of a corresponding one of "m" parallel circuits that are formed by connecting "n" units of the series circuits in parallel to one another with the polarity aligned;
a current detector to detect a current flowing through a multistage series circuit in which both ends of secondary windings of the "m" transformers are sequentially connected in series so that both ends of the circuit serve as output terminals, and to output the detected current as a detected current value;
a controller to output a command signal generated on the basis of a current command and the detected current value, the current command being a target value of the current output from the output terminals; and
drive circuitry to drive the switching elements and the charger on the basis of the command signal, wherein the controller includes:
operating condition generating circuitry to generate an operating condition including the current command and an estimated value of an output voltage that is a voltage across the output terminals on the basis of output data and the current command, the output data including an executed command signal that is the command signal already executed for use by the drive circuitry and the detected current value of a current generated by the executed command signal; and
command signal determining circuitry to determine the command signal on the basis of the operating condition.

2. The power supply device according to claim 1, wherein the command signal includes drive information specifying the number of the parallel circuits to be driven and the number of the switching elements to be driven inside the parallel circuits to be driven, and the command signal determining circuitry associates the operating condition with a current value and a voltage value per piece of the switching elements by the drive information, and determines the command signal on the basis of the associated current value and the associated voltage value.

3. The power supply device according to claim 2, wherein
the command signal determining circuitry determines the command signal such that the associated current value and the associated voltage value are included in an appropriate current range and an appropriate voltage range, respectively, and
the appropriate current range and the appropriate voltage range are determined such that an appropriate operation state of the switching element is achieved when the current value and the voltage value per piece of the switching element are included in the appropriate current range and the appropriate voltage range, respectively.

4. The power supply device according to claim 3, wherein the appropriate operation state is a state in which a time required for switching of the switching element is shorter than or equal to a reference value of a predetermined switching time, and a value of conduction resistance of the switching element is smaller than a reference value for low resistance in an "on" state in which the switching element is conductive, and is larger than a reference value for high resistance in an "off" state in which the switching element is non-conductive.

5. The power supply device according to claim 1, wherein
the controller includes a command signal data set in which an operating range obtained by dividing a possible range of the operating condition into numerical ranges and an intra-data command signal corresponding to each of the operating ranges are combined, and
the command signal determining circuitry extracts the operating range including the operating condition generated by the operating condition generating circuitry from the command signal data set, and determines the intra-data command signal corresponding to the operating range extracted as the command signal.

6. The power supply device according to claim 1, wherein the command signal determining circuitry determines the command signal by selecting, from command signal candidates that are candidates for the command signal, the command signal candidate to be output as the command signal.

7. The power supply device according to claim 1, further comprising a temperature detector to measure a temperature of the switching element and output the temperature as a detected temperature value, wherein the controller determines the command signal on the basis of the detected temperature value.

8. A power supply device comprising:
a power supply control device comprising
"m×n" switching elements (where "m" and "n" are integers of 2 or greater),
"m×n" capacitors connected in series to corresponding ones of the switching elements and forming "m×n" series circuits,
a charger to charge the capacitors,
"m" transformers in which both ends of each primary winding are connected to both ends of a corresponding one of "m" parallel circuits that are formed by connecting "n" units of the series circuits in parallel to one another with the polarity aligned,
a current detector to detect a current flowing through a multistage series circuit in which both ends of secondary windings of the "m" transformers are sequentially connected in series so that both ends of the circuit serve as output terminals, and to output the detected current as a detected current value, a controller to output a command signal generated on the basis of a current command and the detected current value, the current command being a target value of the current output from the output terminals, and drive circuitry to drive the switching elements and the charger on the basis of the command signal;

operation result acquisition circuitry to acquire an output result of the power supply control device;

state quantity observation circuitry to observe a state quantity of the power supply control device or an electrical load device connected to the power supply control device;

learning circuitry to acquire an output from the operation result acquisition circuitry and an output from the state quantity observation circuitry, and learn the command signal in association with the state quantity and the output result; and decision-making circuitry to output the command signal with reference to a learning result learned by the learning circuitry.

9. The power supply device according to claim 8, wherein the learning circuitry includes a learning model to learn the command signal and includes: error calculation circuitry to calculate an error between the output result and a target value of the output result; and learning model update circuitry to update the learning model in accordance with the error.

10. The power supply device according to claim 8, wherein the learning circuitry includes a value function to determine a value of the command signal and further includes: reward calculation circuitry to give a positive reward in accordance with a difference between the output result and a target value of the output result when the difference is small, or give a negative reward in accordance with the difference when the difference is large; and value function update circuitry to update the value function in accordance with the reward.

11. A power supply device comprising:

a power supply control device comprising

"m×n" switching elements (where "m" and "n" are integers of 2 or greater),

"m×n" capacitors connected in series to corresponding ones of the switching elements and forming "m×n" series circuits, a charger to charge the capacitors, "m" transformers in which both ends of each primary winding are connected to both ends of a corresponding one of "m" parallel circuits that are formed by connecting "n" units of the series circuits in parallel to one another with the polarity aligned, a current detector to detect a current flowing through a multistage series circuit in which both ends of secondary windings of the "m" transformers are sequentially connected in series so that both ends of the circuit serve as output terminals, and to output the detected current as a detected current value, a controller to output a command signal generated on the basis of a current command and the detected current value, the current command being a target value of the current output from the output terminals, and drive circuitry to drive the switching elements and the charger on the basis of the command signal; and learned learning circuitry to have performed learning by associating the command signal with a state quantity obtained by observing a state of the power supply control device or an electrical load device connected to the power supply control device, and an output result that is a result output by the power supply control device.

* * * * *